United States Patent
Matsuo et al.

(10) Patent No.: US 11,150,590 B2
(45) Date of Patent: Oct. 19, 2021

(54) EXPOSURE DEVICE AND IMAGE FORMING APPARATUS

(71) Applicant: Konica Minolta, Inc., Tokyo (JP)

(72) Inventors: Takahiro Matsuo, Toyokawa (JP); Atsushi Nagaoka, Okazaki (JP); Hajime Taniguchi, Toyokawa (JP); Ryo Hasegawa, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 44 days.

(21) Appl. No.: 16/862,657

(22) Filed: Apr. 30, 2020

(65) Prior Publication Data
US 2020/0356042 A1    Nov. 12, 2020

(30) Foreign Application Priority Data
May 7, 2019  (JP) .............................. JP2019-087537

(51) Int. Cl.
*G03G 15/00* (2006.01)
*G02B 9/04* (2006.01)

(52) U.S. Cl.
CPC ........... *G03G 15/6597* (2013.01); *G02B 9/04* (2013.01); *G03G 15/6535* (2013.01)

(58) Field of Classification Search
CPC ....................... G03G 15/6535; G03G 15/3597
See application file for complete search history.

(56) References Cited

U.S. PATENT DOCUMENTS

| 7,859,757 | B2 * | 12/2010 | Yamamura | G02B 27/0018 359/621 |
| 10,578,779 | B2 * | 3/2020 | Ooki | G03G 15/0435 |
| 10,768,547 | B2 * | 9/2020 | Ikeda | G02B 3/0062 |

FOREIGN PATENT DOCUMENTS

JP        2011-064848        3/2011

* cited by examiner

*Primary Examiner* — Walter L Lindsay, Jr.
*Assistant Examiner* — Andrew V Do
(74) *Attorney, Agent, or Firm* — BakerHostetler

(57) ABSTRACT

An exposure device includes: a first lens array unit and a second lens array unit each including a plurality of optical elements formed in a formation surface with respective optical axes parallel to each other, the formation surface of the first lens array unit being not perpendicular to the optical axes; a first lens array holder and a second lens array holder that hold the first lens array unit and the second lens array unit with the respective optical axes of the plurality of optical elements parallel to each other; and a light source assembly in which optical element groups each including a plurality of light-emitting devices aligned in a direction perpendicular to the optical axes are disposed at different positions in a direction parallel to the optical axes, wherein the first lens array unit is provided with a first seating surface and a second seating surface.

18 Claims, 15 Drawing Sheets

OPTICAL AXIS
SUBSCANNING DIRECTION

EXPOSURE DEVICE AND IMAGE FORMING APPARATUS

The entire disclosure of Japanese patent Application No. 2019-087537, filed on May 7, 2019, is incorporated herein by reference in its entirety.

BACKGROUND

Technological Field

The present invention relates to an exposure device and an image forming apparatus, and more particularly, relates to an exposure device in which a plurality of light sources is aligned along a main scanning direction, and an image forming apparatus including the exposure device.

Description of the Related Art

In recent years, a line head using organic light-emitting diodes (OLEDs) as light sources has been known. The line head irradiates a photoconductive drum as an image carrier with light emitted from a plurality of light sources via an optical assembly. Thus, the line head forms an electrostatic latent image on the photoconductive drum.

As a method of assembling the optical assembly included in the line head, for example, JP 2011-64848 A discloses a method of assembling an optical assembly in which first flat surfaces of a first lens array orthogonal or substantially orthogonal to a direction parallel to the optical axes of first lenses of the first lens array including the first lenses and the first flat surfaces are joined to first polished surfaces of support members with adhesives, and second polished surfaces parallel to and opposite to the first polished surfaces of the support members are joined with adhesives to second flat surfaces of a second lens array orthogonal or substantially orthogonal to a direction parallel to the optical axes of second lenses of the second lens array including the second lenses and the second flat surfaces.

In recent years, there has been a demand for increasing the number of light-emitting points of the line head due to a demand for higher image definition. However, an increase in the number of light-emitting points results in an increase in the size of a light source board in which light sources are formed. On the other hand, since the line head is disposed in the immediate vicinity of a photoconductive drum, there is a demand for making its size in a subscanning direction smaller than or equal to the upper limit. In order to satisfy these two demands, it is conceivable to stack a plurality of light source boards in which a plurality of light sources aligned in a main scanning direction is formed, out of line in a subscanning direction. In this case, since the plurality of light source boards is stacked, the plurality of light source boards has different optical path lengths. Thus, it is necessary to adjust the distances between the first lenses and the second lenses to distances appropriate to the plurality of light source boards. Specifically, it is necessary to dispose the first lens array and the second lens array at angles with respect to a direction parallel to the optical axes.

However, when one of the first lens array and the second lens array is moved in a direction perpendicular to the optical axes so as to adjust the positions of the first lens array and the second lens array relative to the light sources, the first lens array and the second lens array move along the surfaces in contact with the support members, so that the positions of the first lens array and the second lens array in a direction parallel to the optical axes change. Thus, the work of adjusting the positions of the first lens array and the second lens array relative to the light sources is disadvantageously difficult.

SUMMARY

In order to solve the above-described problem, an object of the present invention is to provide an exposure device that is easy to manufacture.

Another object of the present invention is to provide an image forming apparatus including the exposure device that is easy to manufacture.

To achieve at least one of the abovementioned objects, according to an aspect of the present invention, an exposure device reflecting one aspect of the present invention comprises: a first lens array unit and a second lens array unit each including a plurality of optical elements formed in a formation surface with respective optical axes parallel to each other, the formation surface of the first lens array unit being not perpendicular to the optical axes; a first lens array holder and a second lens array holder that hold the first lens array unit and the second lens array unit with the respective optical axes of the plurality of optical elements parallel to each other; and a light source assembly in which optical element groups each including a plurality of light-emitting devices aligned in a direction perpendicular to the optical axes are disposed at different positions in a direction parallel to the optical axes, wherein the first lens array unit is provided with a first seating surface on which the first lens array holder abuts and a second seating surface on which the second lens array holder abuts, on a surface facing the second lens array unit, and the first seating surface and the second seating surface are perpendicular to the optical axes.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
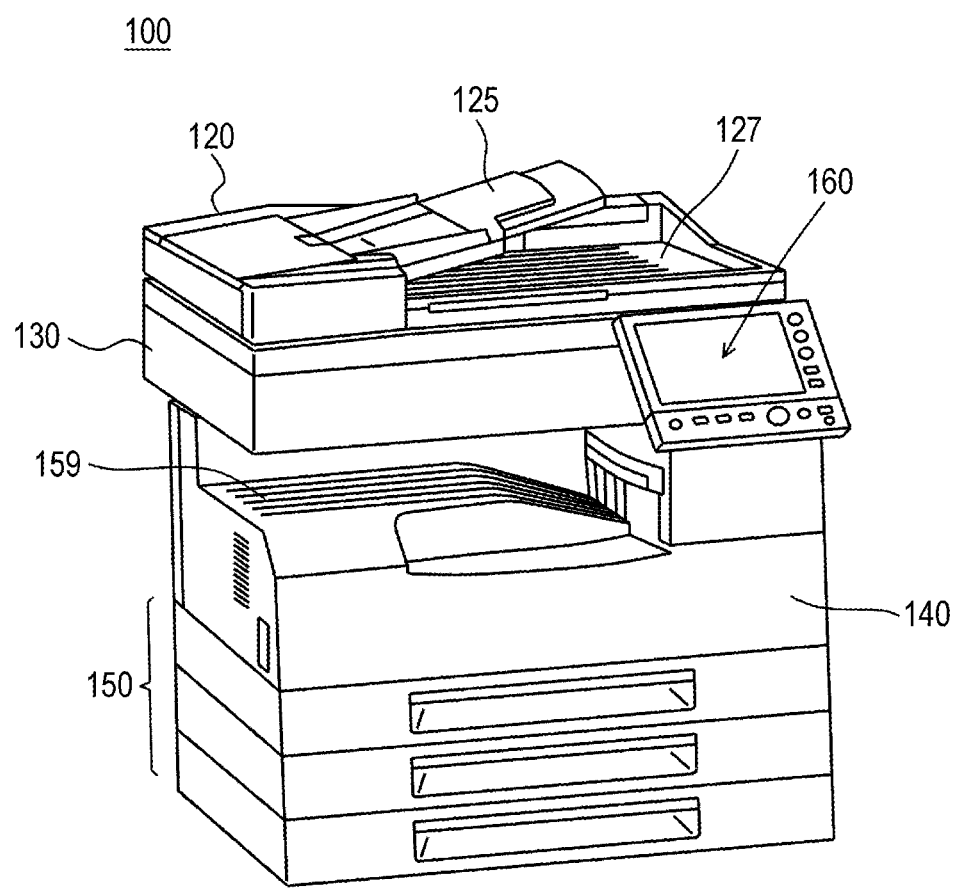
FIG. 1 is a perspective view showing an appearance of an MFP according to an embodiment of the present invention.

Hereinafter, one or more embodiments of the present invention will be described with reference to the drawings. However, the scope of the invention is not limited to the disclosed embodiments. In the following description, the same components are denoted by the same reference numerals. Their names and functions are also the same. Therefore, they will not be repeatedly described in detail.

Figure 2:
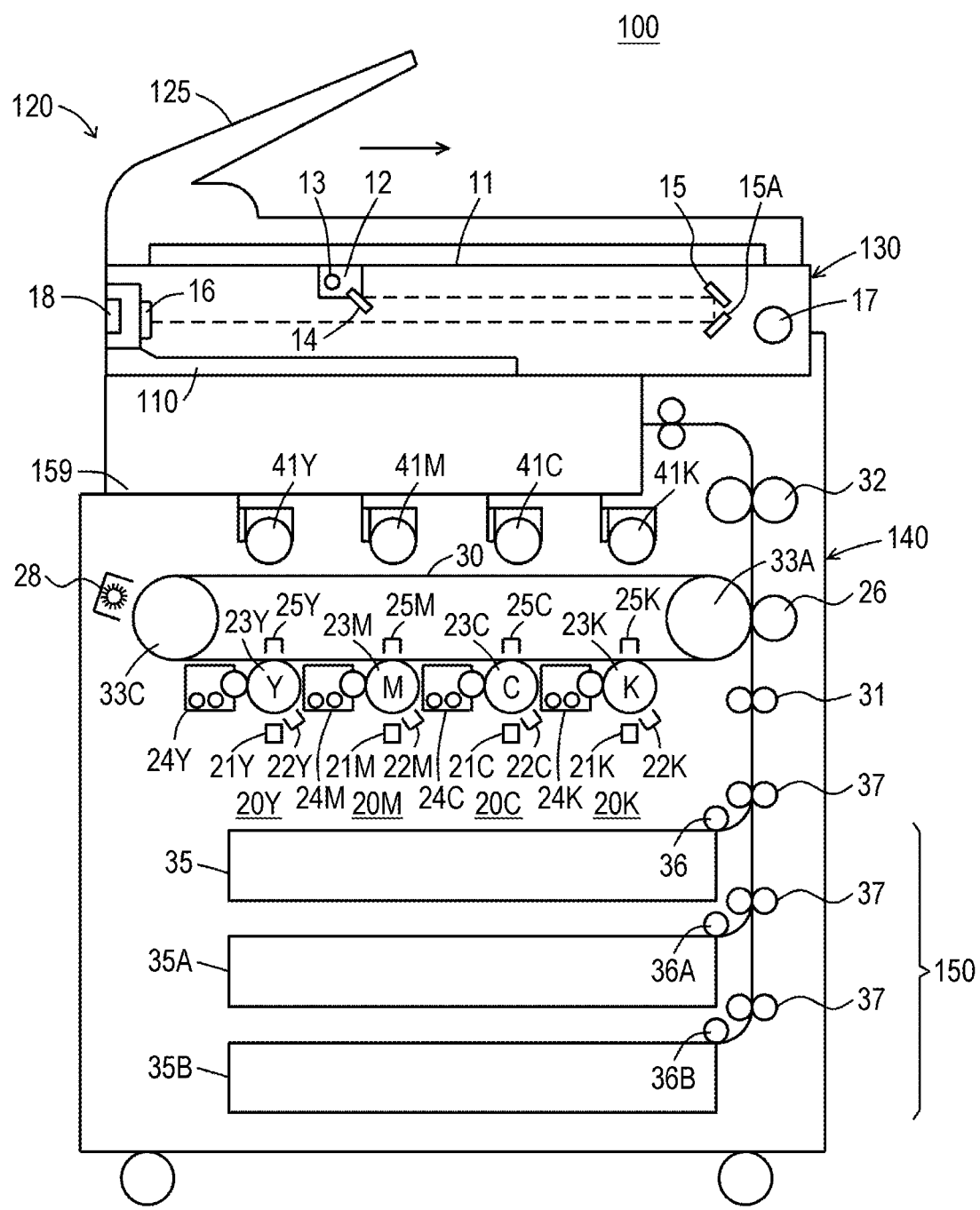
FIG. 2 is a schematic cross-sectional view showing an internal configuration of the MFP.

FIG. 1 is a perspective view showing an appearance of an MFP according to an embodiment of the present invention. FIG. 2 is a schematic cross-sectional view showing an internal configuration of the MFP. Referring to FIGS. 1 and 2, a multifunction peripheral (MFP) 100 is an example of an image forming apparatus, and includes a document reader 130 for reading a document, an automatic document transport 120 for transporting a document to the document reader 130, an image former 140 for forming an image on paper based on image data, a paper feeder 150 for feeding paper to the image former 140, and an operation panel 160 as a user interface.

The automatic document transport 120 separates one or more documents placed on a document tray 125, and feeds them one by one to the document reader 130. The document reader 130 exposes an image on the document set on a document glass 11 by the automatic document transport 120 to light with an exposure lamp 13 mounted on a slider 12 that moves below the document. Light reflected from the document is guided to a lens 16 by a mirror 14 and two reflecting mirrors 15 and 15A, forming an image on a charge-coupled device (CCD) sensor 18. The exposure lamp 13 and the mirror 14 are mounted on the slider 12. The slider 12 is moved by a scanner motor 17 in the direction of an arrow (subscanning direction) shown in FIG. 2 at velocity V depending on a copying scaling factor. Thus, the document set on the document glass 11 can be scanned over the entire surface. With the movement of the exposure lamp 13 and the mirror 14, the two reflecting mirrors 15 and 15A move at velocity V/2 in the direction of the arrow in FIG. 2. Consequently, the length of an optical path travelled by light emitted onto the document by the exposure lamp 13 from when it reflects off the document to when it forms an image on the CCD sensor 18 is always constant.

Reflected light forming an image on the CCD sensor 18 is converted into image data as an electric signal in the CCD sensor 18, and transmitted to the main circuit 110. The main circuit 110 performs A/D conversion processing, digital image processing, and others on the received analog image data, and then outputs the image data to the image former 140. The main circuit 110 converts the image data into cyan (C), magenta (M), yellow (Y), and black (K) print data, and outputs the print data to the image former 140.

The image former 140 includes image forming units 20Y, 20M, 20C, and 20K for yellow, magenta, cyan, and black. Here, "Y", "M", "C", and "K" represent yellow, magenta, cyan, and black, respectively. An image is formed by at least one of the image forming units 20Y, 20M, 20C, and 20K being driven. When all of the image forming units 20Y, 20M, 20C, and 20K are driven, a full-color image is formed. Yellow, magenta, cyan, and black print data are input to the image forming units 20Y, 20M, 20C, and 20K, respectively. The image forming units 20Y, 20M, 20C, and 20K differ only in toner color they handle. Thus, the image forming unit 20Y for forming a yellow image will be described here.

The image forming unit 20Y includes an exposure device 21Y to which yellow print data is input, a photoconductive drum 23Y as an image carrier of the exposure device 21Y, a charging charger 22Y, a developing unit 24Y, a transfer charger 25Y, and a toner bottle 41Y. The toner bottle 41Y contains yellow toner.

The exposure device 21Y emits light according to print data (an electric signal) received from the main circuit 110, exposing the photoconductive drum 23Y as a subject. The photoconductive drum 23Y has a cylindrical shape and rotates around a rotation axis. Here, the rotation axis is parallel to the main scanning direction. The photoconductive drum 23Y is charged by the charging charger 22Y, and then is irradiated with laser light emitted by the exposure device 21Y. Consequently, an electrostatic latent image is formed on the photoconductive drum 23Y. Subsequently, the developing unit 24Y places toner supplied from the toner bottle 41Y on the electrostatic latent image, forming a toner image. The toner image formed on the photoconductive drum 23Y is transferred onto an intermediate transfer belt 30 by the transfer charger 25Y.

On the other hand, the intermediate transfer belt 30 is stretched between a drive roller 33C and a roller 33A with no looseness. When the drive roller 33C rotates counterclockwise in FIG. 2, the intermediate transfer belt 30 rotates counterclockwise in the figure at a predetermined speed. With the rotation of the intermediate transfer belt 30, the roller 33A rotates counterclockwise.

Thus, the image forming units 20Y, 20M, 20C, and 20K sequentially transfer toner images onto the intermediate transfer belt 30. Timings at which the image forming units 20Y, 20M, 20C, and 20K transfer toner images onto the intermediate transfer belt 30 are adjusted by detecting a reference mark provided on the intermediate transfer belt 30. Thus, yellow, magenta, cyan, and black toner images are superimposed on the intermediate transfer belt 30.

A toner image formed on the intermediate transfer belt 30 is transferred to paper by the transfer roller 26. The paper to which the toner image has been transferred is conveyed to a pair of fixing rollers 32 and heated by the pair of fixing rollers 32. Thus, the toner is melted and fixed to the paper. After that, the paper is discharged to an output tray 159.

A removal device 28 is provided for the intermediate transfer belt 30 upstream of the image forming unit 20Y. The removal device 28 removes toner remaining on the intermediate transfer belt 30.

Paper of different sizes is set in paper cassettes 35, 35A, and 35B. The paper stored in the paper cassettes 35, 35A, and 35B is fed to a transport path by take-out rollers 36, 36A, and 36B attached to the paper cassettes 35, 35A, and 35B, respectively, and conveyed to a timing roller 31 by paper feed rollers 37.

The MFP 100 drives all of the image forming units 20Y, 20M, 20C, and 20K when forming a full-color image, and drives one of the image forming units 20Y, 20M, 20C, and 20K when forming a monochrome image. The MFP 100 can also form an image by a combination of two or more of the image forming units 20Y, 20M, 20C, and 20K. Here, the MFP 100 is described as a tandem system including the image forming units 20Y, 20M 20C, and 20K that form toner of four colors on paper. The MFP 100 may be a four-cycle system that uses one photoconductive drum to transfer toner of four colors sequentially on paper.

Next, the exposure devices 21Y, 21M, 21C, and 21K will be described. The exposure devices 21Y, 21M, 21C, and 21K have the same configuration, and thus the exposure device 21Y will be described here as an example.

Figure 3:
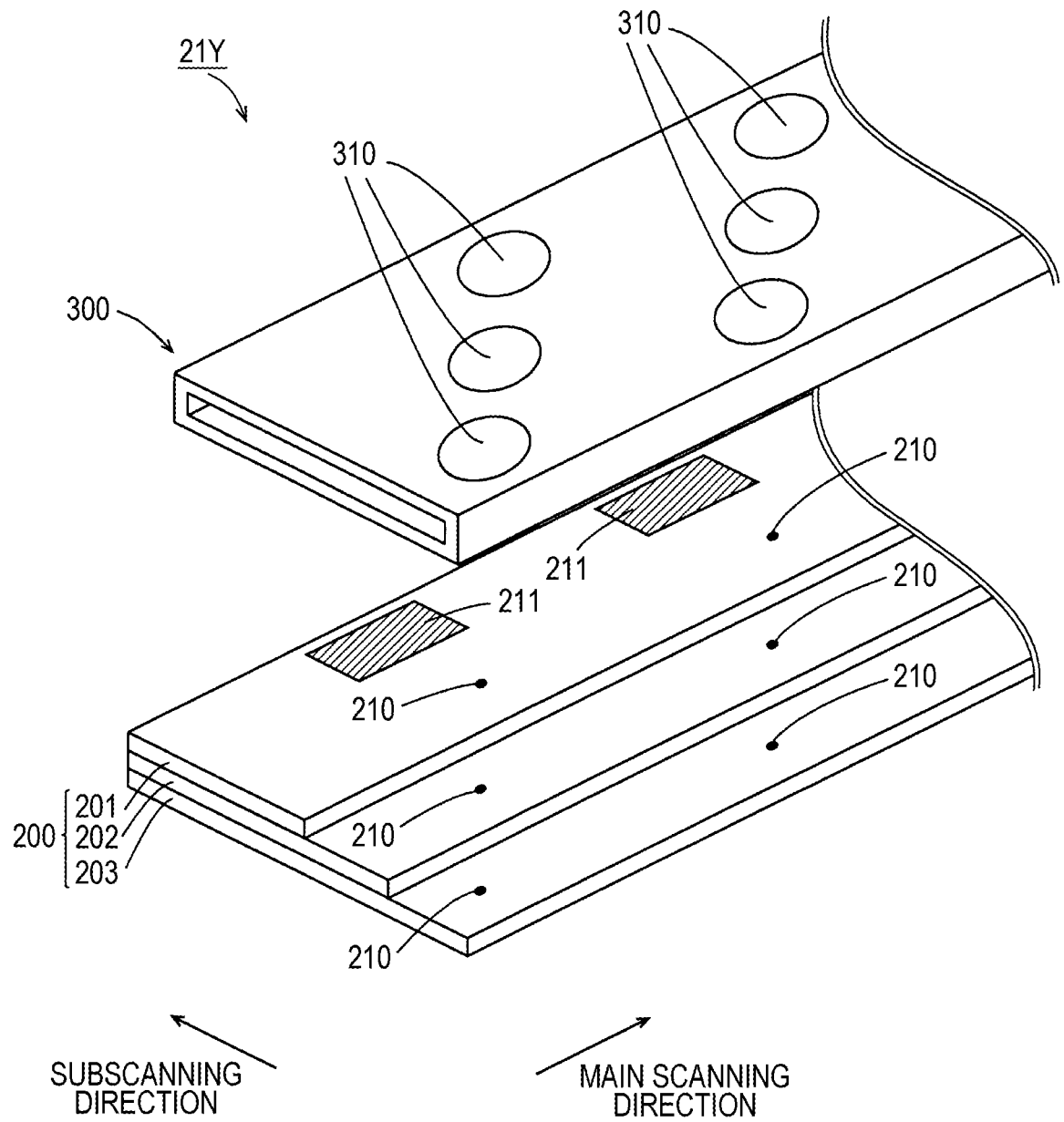
FIG. 3 is a perspective view showing an example of an internal configuration of an exposure device.

FIG. 3 is a perspective view showing an example of an internal configuration of the exposure device. Referring to FIG. 3, the exposure device 21Y includes a light source assembly 200 and an optical assembly 300. The light source assembly 200 includes a first light source board 201, a second light source board 202, and a third light source board 203. On each of the first light source board 201, the second light source board 202, and the third light source board 203, a plurality of light sources 210 aligned in a main scanning direction is formed. The plurality of light sources 210 formed in the first light source board 201 constitutes a first group, the plurality of light sources 210 formed in the second light source board 202 constitutes a second group, and the plurality of light sources 210 formed in the third light source board 203 constitutes a third group. The optical assembly 300 includes a plurality of optical systems 310 that condenses light emitted from the plurality of light sources 210 and concentrates the light onto the photoconductive drum 23Y. In the following description, a direction parallel to the optical axes of the optical assembly 300 is referred to as a vertical direction, and a direction perpendicular to the optical axes is referred to as a horizontal direction. The horizontal direction includes the main scanning direction and the subscanning direction orthogonal to the main scanning direction.

Each of the first light source board 201, the second light source board 202, and the third light source board 203, for example, the first light source board 201 includes circuit regions 211 on which circuits for driving the plurality of light sources 210 is formed. The first light source board 201, the second light source board 202, and the third light source board 203 are placed on top of each other, being out of line in the subscanning direction. The second light source board 202 is disposed below the first light source board 201, and the third light source board 203 is disposed below the second light source board 202.

A part of the first light source board 201 is placed on a part of the second light source board 202, and a part of the second light source board 202 is placed on a part of the third light source board 203. The circuit regions on the second light source board 202 where the circuits for driving the plurality of light sources 210 are formed are placed on part of the first light source board 201, but the plurality of light sources 210 are not placed on the first light source board 201. The circuit regions on the third light source board 203 where the circuits for driving the plurality of light sources 210 are formed are placed on part of the second light source board 202, but the plurality of light sources 210 are not placed on the second light source board 202. Thus, light emitted from the plurality of light sources 210 formed in the first light source board 201, the second light source board 202, and the third light source board 203 is emitted toward the optical systems 310 provided in the optical assembly 300 opposite to the first light source board 201, the second light source board 202, and the third light source board 203.

In the present embodiment, a case where the light source assembly 200 includes three light source boards, the first light source board 201, the second light source board 202, and the third light source board 203, is described as an example, but the number of light source boards is not limited to this, and only needs to be two or more.

Figure 4:
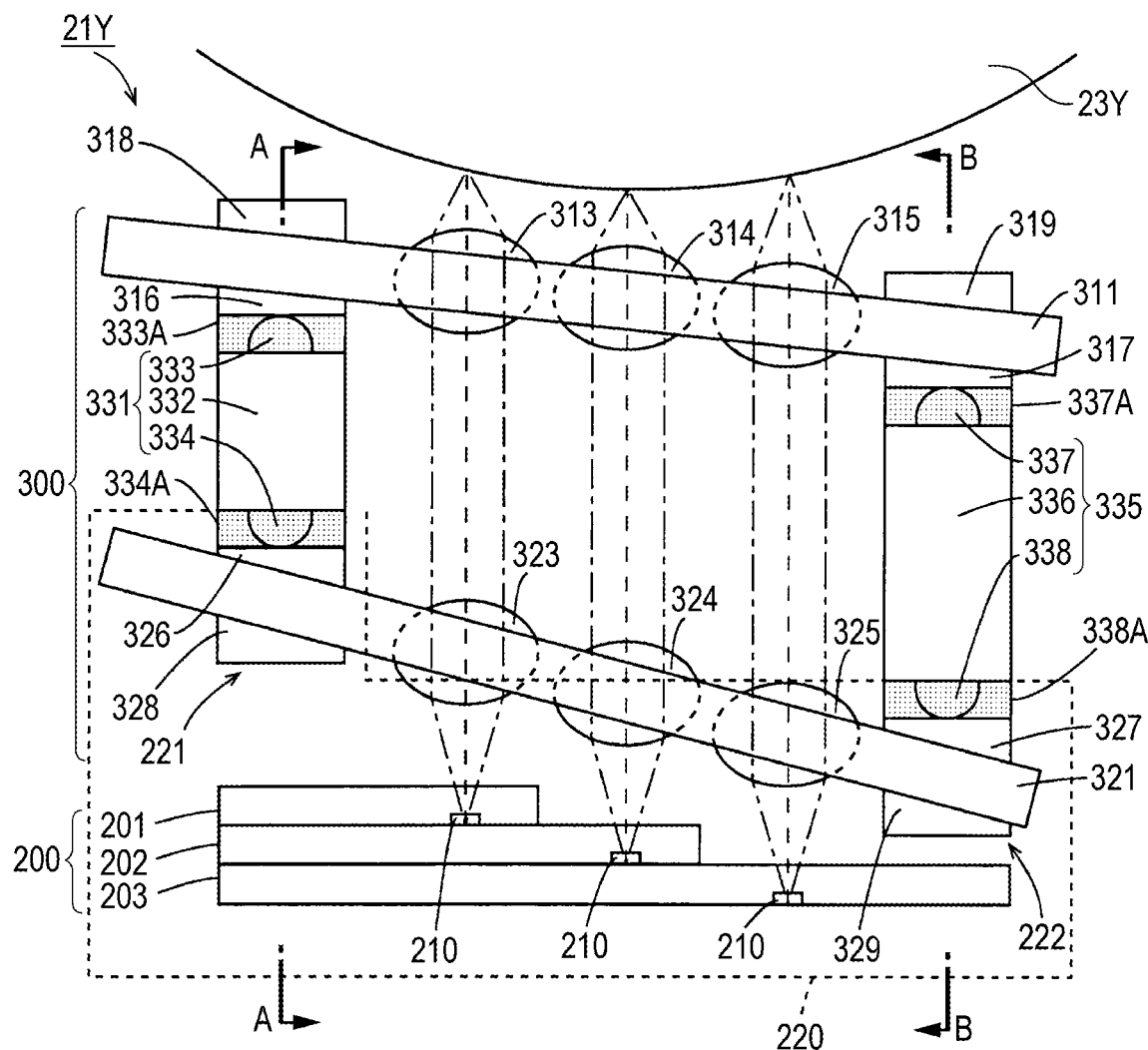
FIG. 4 is a diagram of the inside of the exposure device as viewed from a main scanning direction.
Figure 5:
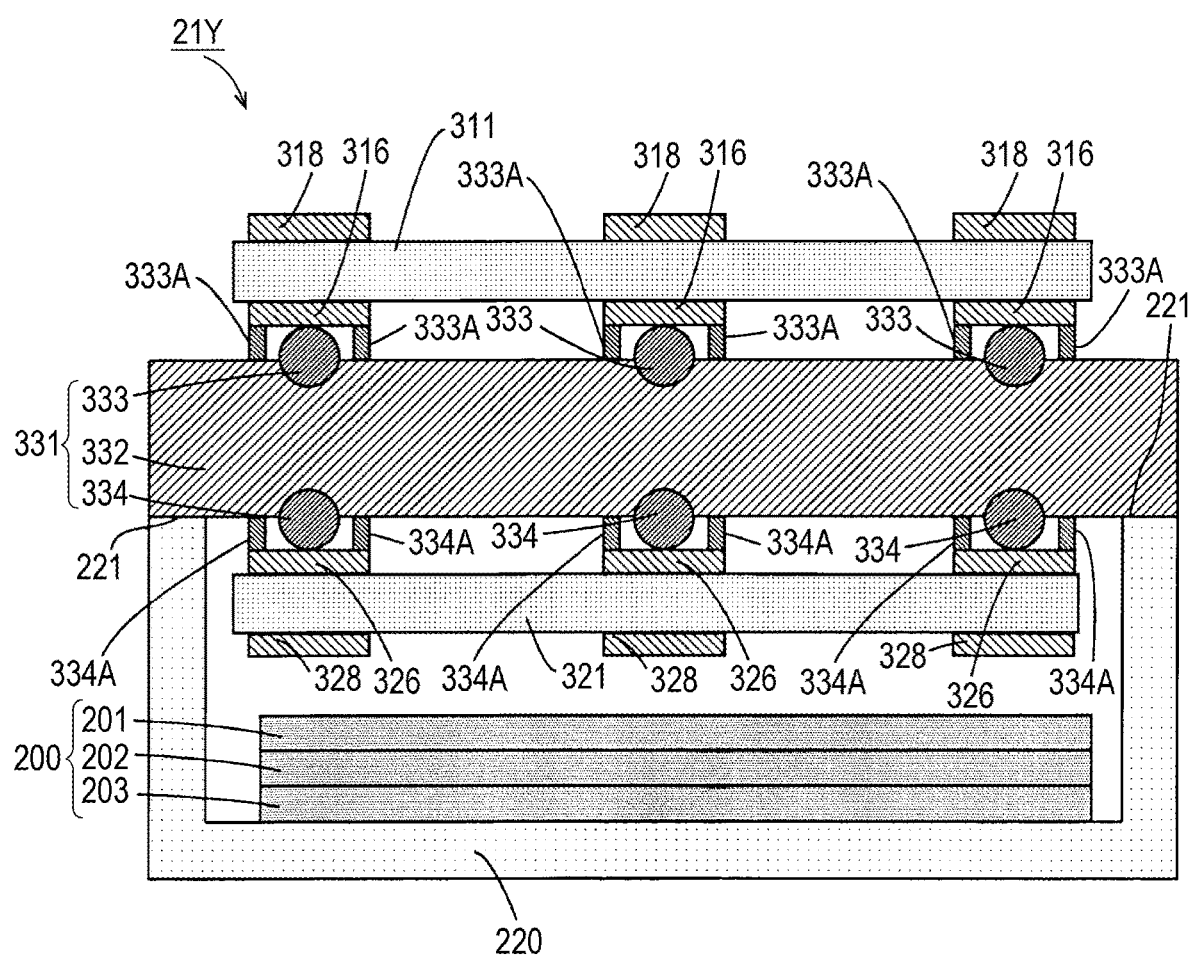
FIG. 5 is a cross-sectional view taken along line A-A in FIG. 4.
Figure 6:
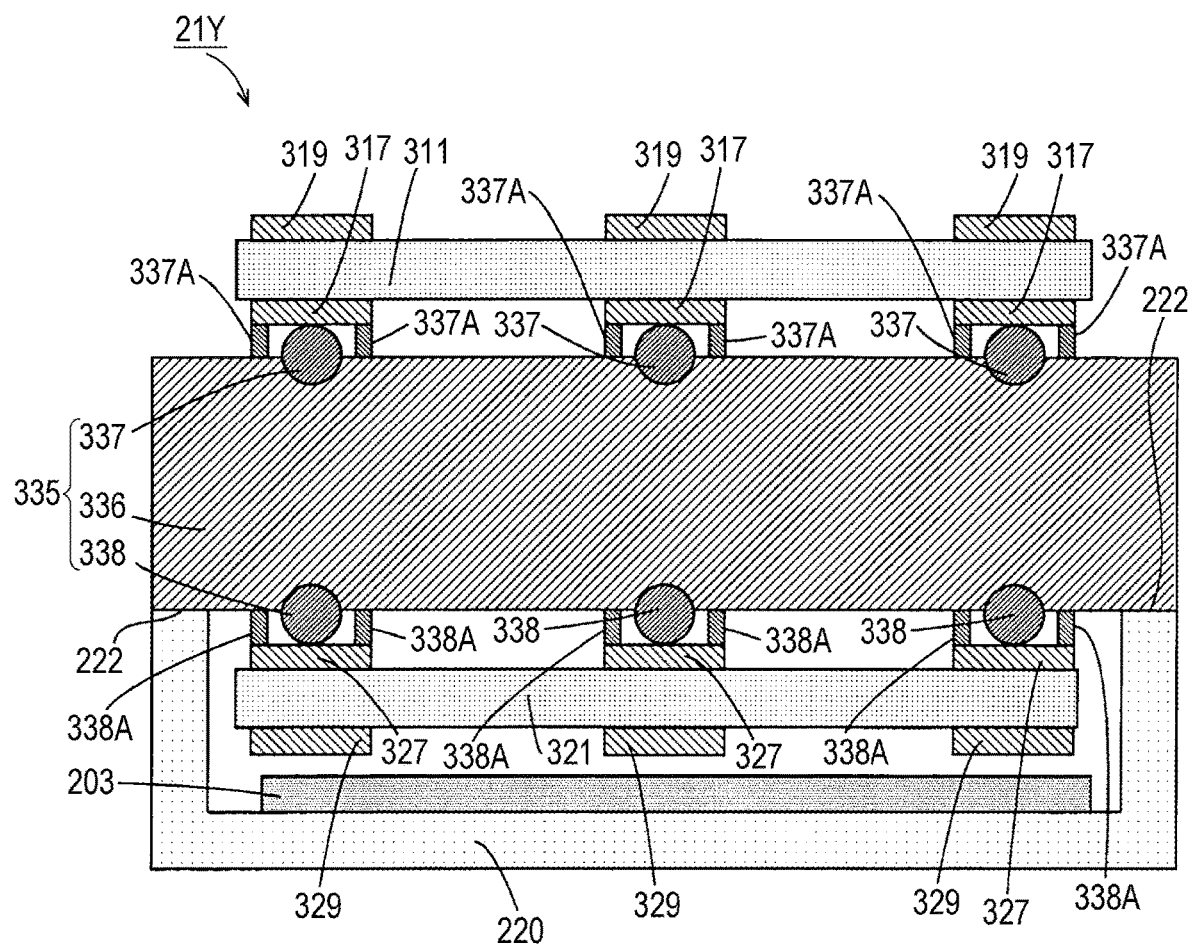
FIG. 6 is a cross-sectional view taken along line B-B in FIG. 4.

FIG. 4 is a diagram of the inside of the exposure device as viewed from the main scanning direction. The main scanning direction is a direction perpendicular to the sheet surface in FIG. 4. FIG. 5 is a cross-sectional view taken along line A-A in FIG. 4. FIG. 6 is a cross-sectional view taken along line B-B in FIG. 4. In FIGS. 5 and 4, a light source holder 220 is added. Referring to FIGS. 4 to 6, the exposure device 21Y includes the optical assembly 300 and the light source assembly 200. The optical assembly 300 includes a first lens array unit 311, a second lens array unit 321, and a first lens array holder 331 and a second lens array holder 335 each holding the first lens array unit 311 and the second lens array unit 321. The light source assembly 200 includes the light source holder 220, the first light source board 201, the second light source board 202, and the third light source board 203. The first light source board 201, the second light source board 202, and the third light source board 203 are stacked and joined, and the third light source board 203 is positioned on and fixed to the light source holder 220.

The first lens array unit 311 is a glass board in which a plurality of first lenses 313, 314, and 315 is formed with their optical axes parallel to each other. The first lens 313 is one of a plurality of first lenses included in a first group aligned in the main scanning direction. The plurality of first lenses included in the first group corresponds one-to-one to the plurality of light sources 210 formed in the first light source board 201. The first lens 314 is one of a plurality of first lenses included in a second group aligned in the main scanning direction. The plurality of first lenses included in the second group corresponds one-to-one to the plurality of light sources 210 formed in the second light source board 202. The first lens 315 is one of a plurality of first lenses included in a third group aligned in the main scanning direction. The plurality of first lenses included in the third group corresponds one-to-one to the plurality of light sources 210 formed in the third light source board 203.

The second lens array unit 321 is a glass board in which a plurality of second lenses 323, 324, and 325 is formed with their optical axes parallel to each other. The second lens 323 is one of a plurality of second lenses included in the first group aligned in the main scanning direction. The plurality of second lenses included in the first group corresponds one-to-one to the plurality of light sources 210 formed in the first light source board 201. The second lens 324 is one of a plurality of second lenses included in the second group aligned in the main scanning direction. The plurality of second lenses included in the second group corresponds one-to-one to the plurality of light sources 210 formed in the second light source board 202. The second lens 325 is one of a plurality of second lenses included in the third group aligned in the main scanning direction. The plurality of second lenses included in the third group corresponds one-to-one to the plurality of light sources 210 formed in the third light source board 203.

The first lens array unit 311 and the second lens array unit 321 are bonded to the first lens array holder 331 and the second lens array holder 335, constituting the optical assembly 300. The first lens array unit 311 and the second lens array unit 321 are positioned by the first lens array holder 331 and the second lens array holder 335 such that light that has passed through one of the plurality of second lenses 323, 324, and 325 formed in the second lens array unit 321 passes through one of the plurality of first lenses 313, 314, and 315 formed in the first lens array unit 311.

Specifically, the first lens 313 and the second lens 323 constitute one optical system 310, and concentrate light emitted from the light source 210 formed in the first light source board 201 onto the photoconductive drum 23Y. The first lens 314 and the second lens 324 constitute one optical system 310, and concentrate light emitted from the light source 210 formed in the second light source board 202 onto the photoconductive drum 23Y. The first lens 315 and the second lens 325 constitute one optical system 310, and the optical system 310 concentrates light emitted from the light source 210 formed in the third light source board 203 onto the photoconductive drum 23Y.

Since the first light source board 201, the second light source board 202, and the third light source board 203 are placed on top of each other, being out of line in the subscanning direction, the light sources 210 formed in the first light source board 201, the light sources 210 formed in the second light source board 202, and the light sources 210 formed in the third light source board 203 are disposed out of line in a direction parallel to the optical axes. Thus, the distance between the light sources 210 formed in the first light source board 201 and the photoconductive drum 23Y is shorter than the distance between the light sources 210 formed in the second light source board 202 and the photoconductive drum 23Y, and the distance between the light sources 210 formed in the second light source board 202 and the photoconductive drum 23Y is shorter than the distance between the light sources 210 formed in the third light source board 203 and the photoconductive drum 23Y.

Therefore, the first lens array unit 311 and the second lens array unit 321 are disposed in positions where normals to a formation surface in which the first lenses 313, 314, and 315 are formed in the first lens array unit 311 and a formation surface in which the second lenses 323, 324, and 325 are formed in the second lens array unit 321 are not parallel to the optical axes and intersect each other, so that light emitted from each of the plurality of light sources 210 is concentrated onto the photoconductive drum 23Y. The first lenses 313, 314, and 315 may be formed such that the formation surface of the first lens array unit 311 is perpendicular to the optical axes of the first lenses 313, 314, and 315. In this case, the first lens array unit 311 is disposed such that the formation surface of the first lens array unit 311 is perpendicular to the optical axes of the first lenses 313, 314, and 315. The second lenses 323, 324, and 325 may be formed such that the formation surface of the second lens array unit 321 is perpendicular to the optical axes of the second lenses 323, 324, and 325. In this case, the second lens array unit 321 is disposed such that the formation surface of the second lens array unit 321 is perpendicular to the optical axes of the second lenses 323, 324, and 325. However, the formation surface of at least one of the first lens array unit 311 and the second lens array unit 321 is not perpendicular to the optical axes of the first lenses 313, 314, and 315 and the second lenses 323, 324, and 325.

The first lens array unit 311 includes three first seats 316 and three second seats 317 formed on a surface facing the second lens array unit 321. The first seats 316 and the second seats 317 are formed near both ends of the first lens array unit 311 in the main scanning direction. The second lens array unit 321 includes three third seats 326 and three fourth seats 327 formed on a surface facing the first lens array unit 311. The third seats 326 and the fourth seats 327 are formed near both ends of the second lens array unit 321 in the subscanning direction. The first seats 316 and the third seats 326 are disposed at opposed positions, and the second seats 317 and the fourth seats 327 are disposed at opposed positions.

The first seats 316 and the second seats 317 have seating surfaces perpendicular to the optical axes of the first lenses 313, 314, and 315. The third seats 326 and the fourth seats 327 have seating surfaces perpendicular to the optical axes of the second lenses 323, 324, and 325. Thus, the seating surfaces of the first seats 316 face the seating surfaces of the third seats 326, and the seating surfaces of the second seats 317 face the seating surfaces of the fourth seats 327.

The three first seats 316 and the three second seats 317 are provided along the main scanning direction. The number of the first seats 316 and the second seats 317 is not limited to three, and only needs to be two or more. The first lenses 313, 314, and 315 are arranged in a region between the first seats 316 and the second seats 317. The three third seats 326 and the three fourth seats 327 are provided along the main scanning direction. The number of the third seats 326 and the fourth seats 327 is not limited to three, and only needs to be two or more. The second lenses 323, 324, and 325 are arranged in a region between the third seats 326 and the fourth seats 327.

Further, the first lens array unit 311 includes, on a surface opposite to the surface on which the first seats 316 are formed, first pressing parts 318 formed at positions opposite to the first seats 316, and second pressing parts 319 formed at positions opposite to the second seats 317. The first pressing parts 318 and the second pressing parts 319 have pressing surfaces perpendicular to the optical axes of the first lenses 313, 314, and 315. Likewise, the second lens array unit 321 includes, on a surface opposite to the surface on which the third seats 326 are formed, third pressing parts 328 formed at positions opposite to the third seats 326, and fourth pressing parts 329 formed at positions opposite to the fourth seats 327. The third pressing parts 328 and the fourth pressing parts 329 have pressing surfaces perpendicular to the optical axes of the second lenses 323, 324, and 325.

The material of the first lens array unit 311 is a glass material, and the material of the first seats 316 and the first pressing parts 318 is a resin material, and thus their coefficients of linear expansion are different. Therefore, in order to prevent heat distortion, it is preferable that the first seats 316 and the first pressing parts 318 have the same thickness in the height direction. For example, the first seats 316 and the first pressing parts 318 may have a point-symmetric shape. Likewise, it is preferable that the second seats 317 and the second pressing parts 319 have the same thickness in the height direction, the third seats 326 and the third pressing parts 328 have the same thickness in the height direction, and the fourth seats 327 and the fourth pressing parts 329 have the same thickness in the height direction.

The first lens array unit 311 has the glass board in and on which the first lenses 313, 314, and 315, the first seats 316 and the second seats 317, and the first pressing parts 318 and the second pressing parts 319 are formed using a resin material. This allows an increase in the accuracy of aligning the directions of the optical axes of the first lenses 313, 314, and 315 and the respective directions of the seating surfaces of the first seats 316, the seating surfaces of the second seats 317, the pressing surfaces of the first pressing parts 318, and the pressing surfaces of the second pressing parts 319. The first seats 316 and the second seats 317 may be produced separately from the first lenses 313, 314, and 315, and fixed to the first lens array unit 311 by bonding. Like the first lens array unit 311, the second lens array unit 321 is produced by forming the second lenses 323, 324, and 325, the third seats 326 and the fourth seats 327, and the third pressing parts 328 and the fourth pressing parts 329 in and on the glass board using the same resin material.

The first lens array holder 331 includes a rectangular parallelepiped body 332, first abutting parts 333 disposed on the top surface of the body 332, and third abutting parts 334 disposed on the bottom surface of the body 332. The first abutting parts 333 abut on the seating surfaces of the first seats 316 of the first lens array unit 311, and the third abutting parts 334 abut on the seating surfaces of the third seats 326 of the second lens array unit 321. The distance between the upper ends of the first abutting parts 333 and the lower ends of the third abutting parts 334 is determined in advance.

In the present embodiment, the first abutting parts 333 and the third abutting parts 334 are each a sphere. The first lens array holder 331 has holes formed on the top surface of the body 332, in which the first abutting parts 333 are fitted, and holes formed on the bottom surface of the body 332 at positions corresponding to the positions of the holes formed on the top surface, in which the third abutting parts 334 are fitted. The top surface and the bottom surface of the body 332 are perpendicular to the optical axes. Regions around the positions of the first abutting parts 333 of the top surface of the body 332 are first bonding surfaces, and regions around the positions of the third abutting parts 334 of the bottom surface of the body 332 are second bonding surfaces.

Thus, the first abutting parts 333 are fitted at positions on the top surface of the body 332 opposite to the positions at which the third abutting parts 334 are fitted. Consequently, the position of the first lens array holder 331 relative to the first lens array unit 311 and the second lens array unit 321 can be determined such that the respective centers of the first abutting parts 333 and the third abutting parts 334 are at positions passing through straight lines parallel to the respective optical axes of the first lenses 313, 314, and 315 and the second lenses 323, 324, and 325.

Like the first lens array holder 331, the second lens array holder 335 includes a rectangular parallelepiped body 336, second abutting parts 337 disposed on the top surface of the body 336, and fourth abutting parts 338 disposed on the bottom surface of the body 336. The top surface and the bottom surface of body 336 are perpendicular to the optical axes. Regions around the positions of the second abutting parts 337 of the top surface of the body 336 are second bonding surfaces, and regions around the positions of the fourth abutting parts 338 of the bottom surface of the body 336 are fourth bonding surfaces. The second abutting parts 337 abut on the seating surfaces of the second seats 317 of the first lens array unit 311, and the fourth abutting parts 338 abut on the seating surfaces of the fourth seats 327 of the second lens array unit 321. The distance between the upper ends of the second abutting parts 337 and the lower ends of the fourth abutting parts 338 is determined in advance.

The distance between the upper ends of the second abutting parts 337 and the lower ends of the fourth abutting parts 338 of the second lens array holder 335 is set longer than the distance between the upper ends of the first abutting parts 333 and the lower ends of the third abutting parts 334 of the first lens army holder 331 so that the optical axes of the first lenses 313, 314, and 315 formed in the first lens army unit 311 are parallel to the optical axes of the second lenses 323, 324, and 325 formed in the second lens array unit 321.

On the top surface of the light source holder 220, a pair of first holder seating surfaces 221 are formed which abut on the bottom surface of the body 332 of the first lens array holder 331. Further, on the top surface of the light source holder 220, a pair of second holder seating surfaces 222 are formed which abut on the bottom surface of the body 336 of the second lens array holder 335. The pair of first holder seating surfaces 221 and the pair of second holder seating surfaces 222 are perpendicular to the optical axes of the first lenses 313, 314, and 315 and the second lenses 323, 324, and 325. The bottom surface of the body 332 of the first lens array holder 331 and the bottom surface of the body 336 of the second lens array holder 335 are perpendicular to the optical axes of the first lenses 313, 314, and 315 and the second lenses 323, 324, and 325.

Consequently, with the body 332 of the first lens array holder 331 abutting on the pair of first holder seating surfaces 221 and with the body 336 of the second lens array holder 335 abutting on the pair of second holder seating surfaces 222, the distance between the second lenses 323, 324, and 325 formed in the second lens array unit 321 and the plurality of light sources 210 in the direction parallel to the optical axes is uniform. This eliminates the need for the work of adjusting the positions of the second lenses 323, 324, and 325 formed in the second lens array unit 321 and the plurality of light sources 210 in the direction parallel to the optical axes, and facilitates the work of aligning their relative positions in the direction perpendicular to the optical axes. The light source holder 220 and the body 332 of the first lens array holder 331, and the light source holder 220 and the body 336 of the second lens array holder 335 may be bonded with adhesives.

Figure 7:
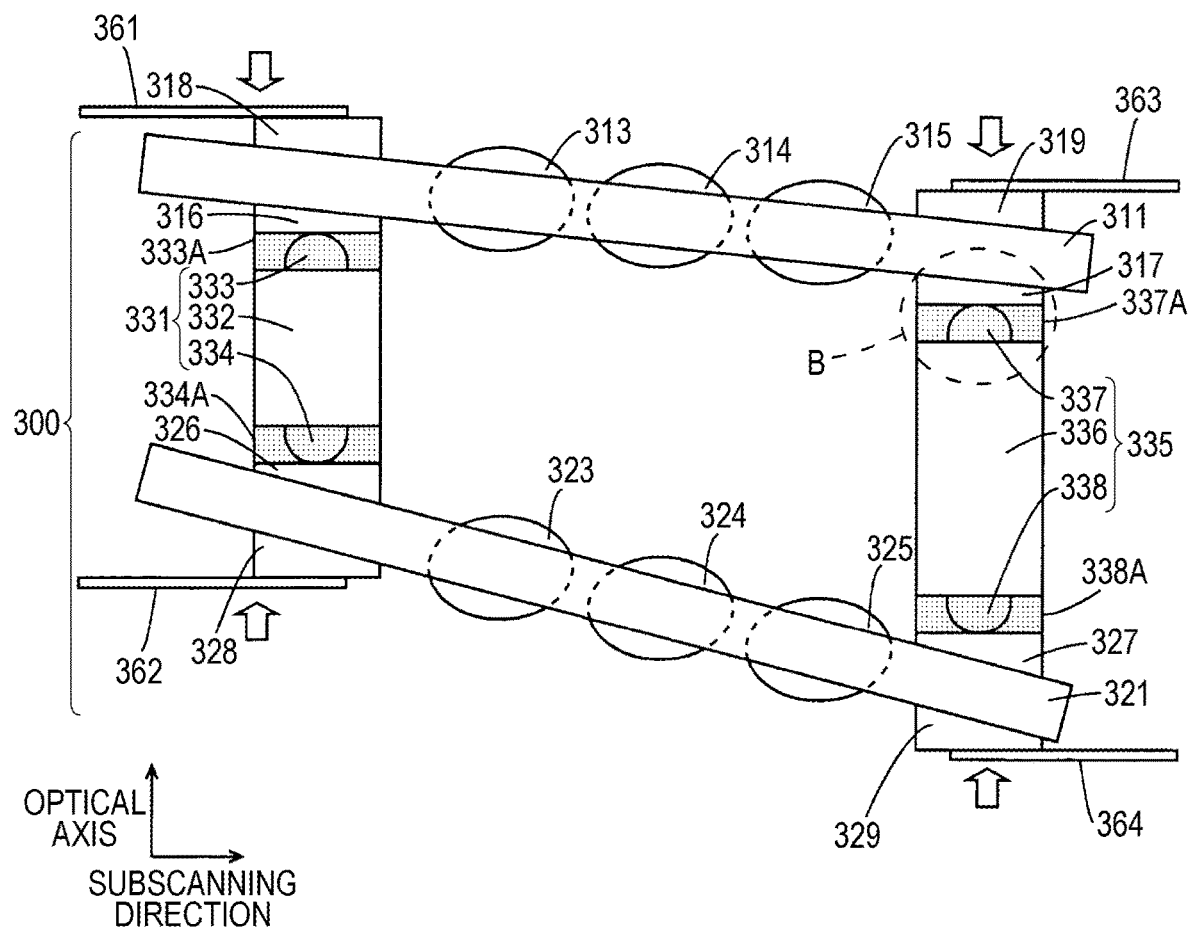
FIG. 7 is a diagram of part of an optical assembly in the course of manufacture as viewed from the main scanning direction.

FIG. 7 is a diagram of part of the optical assembly in the course of manufacture as viewed from the main scanning direction. Referring to FIG. 7, the optical assembly 300 is fixed by a pair of jig springs 361 and 362 and a pair of jig springs 363 and 364 sandwiching it from above and below. In order to reduce misalignment at the time of bonding and fixing, the direction of pressing by the pair of jig springs 361 and 362 is set to be perpendicular to the pressing surfaces of the first pressing parts 318 and the pressing surfaces of the third pressing parts 328, and the direction of pressing by the pair of jig springs 363 and 364 is set to be perpendicular to the pressing surfaces of the second pressing parts 319 and the pressing surfaces of the fourth pressing parts 329.

In the manufacturing of the optical assembly 300, before the first lens array unit 311 and the second lens array unit 321 are bonded and fixed to the first lens array holder 331 and the second lens array holder 335, the first lens array unit 311 and the second lens array unit 321 come off the first lens array holder 331 and the second lens array holder 335 due to warps caused by their own weight or machining errors, or the like. To bring the first seats 316, the second seats 317, the third seats 326, and the fourth seats 327 into contact with the first abutting parts 333, the second abutting parts 337, the third abutting parts 334, and the fourth abutting parts 338, the optical assembly 300 is pressed by the pair of jig springs 361 and 362 and the pair of jig springs 363 and 364. At this time, if the first lens array unit 311 and the second lens array unit 321 are directly pressed by the pair of jig springs 361 and 362 and the pair of jig springs 363 and 364, the pressing direction is not perpendicular to the seating surfaces of the first seats 316, the second seats 317, the third seats 326, and the fourth seats 327. In addition, when the positions of the first lens array unit 311 and the second lens array unit 321 are adjusted, the pressing forces of the jig springs change, so that distortion may occur in the first lens array unit 311 and the second lens array unit 321. Therefore, the first lens array unit 311 is provided with the first pressing parts 318 and the second pressing parts 319, and the second lens array unit 321 is provided with the third pressing parts 328 and the fourth pressing parts 329.

Adhesives 333A, 334A, 337A, and 338A are applied to first bonding portions of the top surface of the body 332 of the first lens array holder 331, third bonding portions of the bottom surface of the body 332, second bonding portions of the top surface of the body 336 of the second lens array holder 335, and fourth bonding portions of the bottom surface of the body 336, respectively. After that, the first lens array unit 311, the second lens array unit 321, the first lens array holder 331, and the second lens array holder 335 are positioned. Specifically, the first lens array holder 331 is positioned such that the centers of the first abutting parts 333 and the centers of the third abutting parts 334 are disposed on straight lines parallel to the optical axes of the first lenses 313, 314, and 315 and the second lenses 323, 324, and 325. Likewise, the second lens array holder 335 is positioned such that the centers of the second abutting parts 337 and the centers of the fourth abutting parts 338 are disposed on straight lines parallel to the optical axes of the first lenses 313, 314, and 315 and the second lenses 323, 324, and 325.

The jig springs 361 and 363 abut against the first pressing parts 318 and the second pressing parts 319 of the first lens array unit 311, respectively, applying downward forces. The jig springs 362 and 364 abut against the third pressing parts 328 and the fourth pressing parts 329 of the second lens array unit 321, respectively, applying upward forces.

In this state, the first lens array unit 311 receives downward forces from the first pressing parts 318 and the second pressing parts 319, and receives upward forces from the first lens array holder 331 and the second lens array holder 335. The second lens array unit 321 receives upward forces from the third pressing parts 328 and the fourth pressing parts 329, and receives downward forces from the first lens array holder 331 and the second lens array holder 335. Thus, the first lens array unit 311 and the second lens array unit 321 do not receive forces in the horizontal direction.

Even when the first lens array unit 311 or the second lens array unit 321 is moved in the horizontal direction, the distance between the first lenses 313 and the second lenses 323 in the first group of optical systems, the distance between the first lenses 314 and the second lenses 324 in the second group of optical systems, and the distance between the first lenses 315 and the second lenses 325 in the third group of optical systems do not change. Thus, the first lens array unit 311 and the second lens array unit 321 are easily adjusted in position in the horizontal direction. Further, the distances between the lenses in the first to third groups of optical systems are determined by the first lens array holder 331 and the second lens array holder 335. This eliminates the need for the work of adjusting the distances between the lenses in the first to third groups of optical systems.

For the first lens array unit 311 and the first lens array holder 331 and the second lens array holder 335, the first bonding portions that are regions around the first abutting parts 333 of the first lens array holder 331 are bonded to the seating surfaces of the first seats 316 with the adhesives 333A, and the second bonding portions that are regions around the second abutting parts 337 of the second lens array holder 335 are bonded to the seating surfaces of the second seats 317 with the adhesives 337A.

Likewise, for the second lens array unit 321 and the first lens array holder 331 and the second lens array holder 335, the third bonding portions that are regions around the third abutting parts 334 of the first lens array holder 331 are bonded to the seating surfaces of the third seats 326 with the adhesives 334A, and the fourth bonding portions that are regions around the fourth abutting parts 338 of the second lens array holder 335 are bonded to the seating surfaces of the fourth seats 327 with the adhesives 338A.

Figure 8:
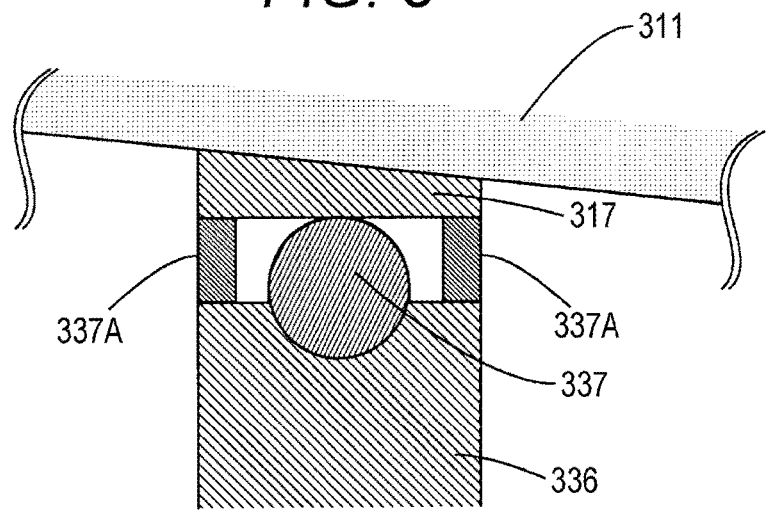
FIG. 8 is a cross-sectional view of a region in FIG. 7.

FIG. 8 is a cross-sectional view of a region R in FIG. 7. Referring to FIG. 8, the first lens array unit 311 and the second lens array holder 335 are bonded together with the adhesives 337A at the second bonding portions around the second abutting parts 337 on the top surface of the body 336 of second lens array holder 335. Thus, the adhesives 337A are not applied to the second abutting parts 337. Since the second abutting parts 337 abut on the second seats 317 of the first lens array unit 311, the second bonding portions around the second abutting parts 337 on the top surface of the body 336 of the second lens array holder 335 have a predetermined distance from the second seats 317 of the first lens array unit 311. Consequently, joints formed by the adhesives 337A cured have a predetermined height.

The adhesives 337A are of a material having a predetermined elasticity even when cured. Therefore, even when the coefficients of linear expansion of the first lens array unit 311 and the second lens array holder 335 are different, the joints of the cured adhesives 337A elastically deform, and thus can prevent separation of the joints of the cured adhesives 337A from the first lens array unit 311 and the second lens array holder 335 at the bonding surfaces. Specifically, adhesive forces at the bonding surfaces between the joints of the cured adhesives 337A and the first lens array unit 311 and the bonding surfaces between the joints and the second lens array holder 335 can be prevented from being lost.

The second lens array holder 335 is of a metal material, and the first lens array unit 311 is of a glass material, and thus their coefficients of linear expansion are different. Therefore, if the height of the joints of the cured adhesives 337A is small, heat distortion occurs in the optical assembly. In order to prevent the heat distortion, the height of the joints of the cured adhesives 337A is set to a predetermined value or higher. Consequently, the difference in thermal expansion between the second lens array holder 335 and the first lens array unit 311 is absorbed by the joints of the cured adhesives 337A, and the first lens array unit 311 is kept pressed against the second lens array holder 335 by the cure shrinkage forces of the adhesives 337A.

Pressures applied to the first lens array unit 311 include pressures applied by the pair of jig spring 363 and jig spring 364, and pressures when the adhesives 337A cure and shrink. In order to prevent deformation of the second pressing parts 319 and the second seats 317 caused by these pressures, it is preferable that the thicknesses of the second pressing parts 319 and the second seats 317 are small. Preferably, the thicknesses of the second pressing parts 319 and the second seats 317 are 1 mm or less. The same applies to the thicknesses of the first pressing parts 318 and the first seats 316, the thicknesses of the third pressing parts 328 and the third seats 326, and the thicknesses of the fourth pressing parts 329 and the fourth seats 327.

<First Modification>

Figure 9:
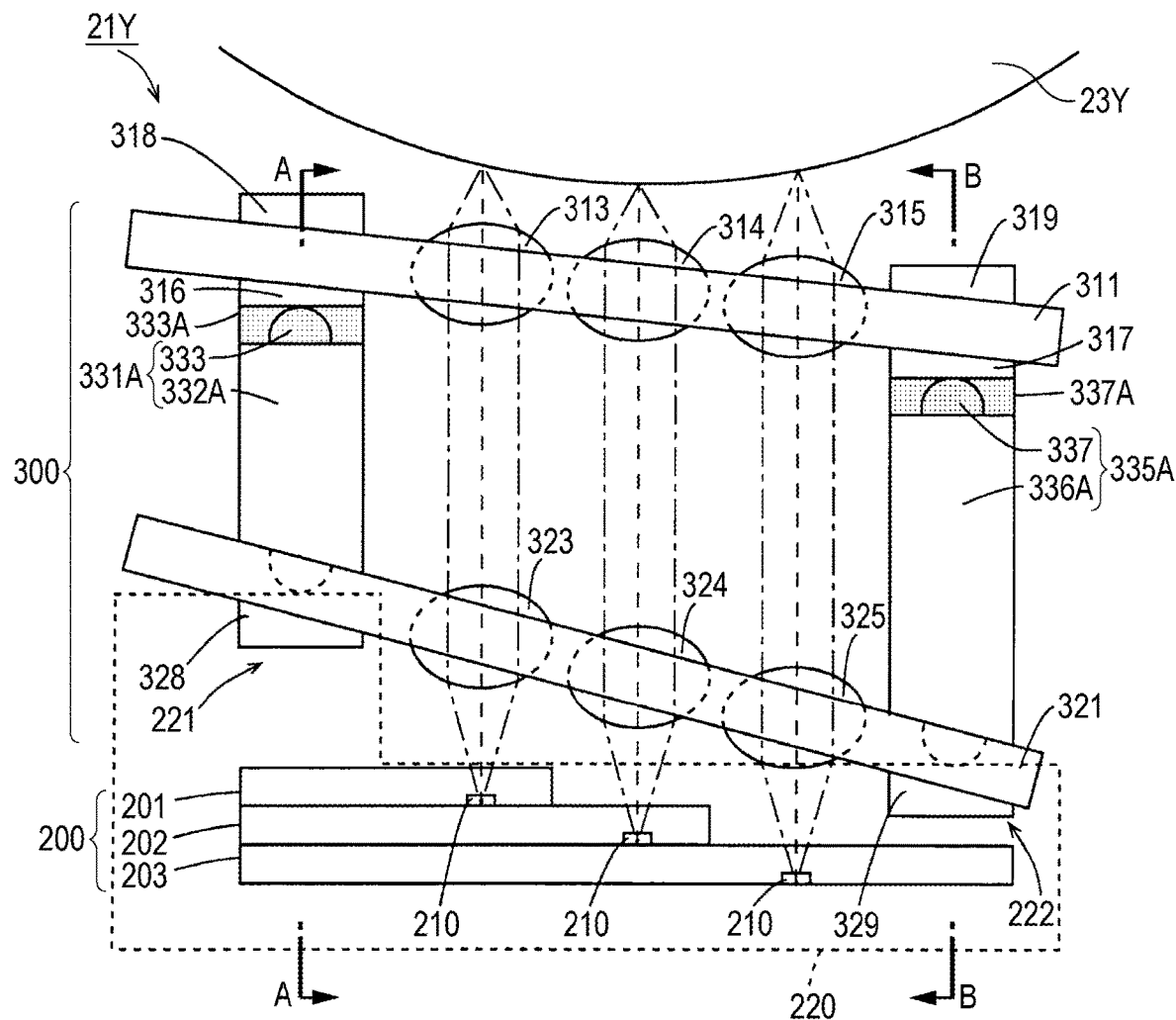
FIG. 9 is a diagram of the inside of the exposure device according to a first modification as viewed from the main scanning direction.
Figure 10:
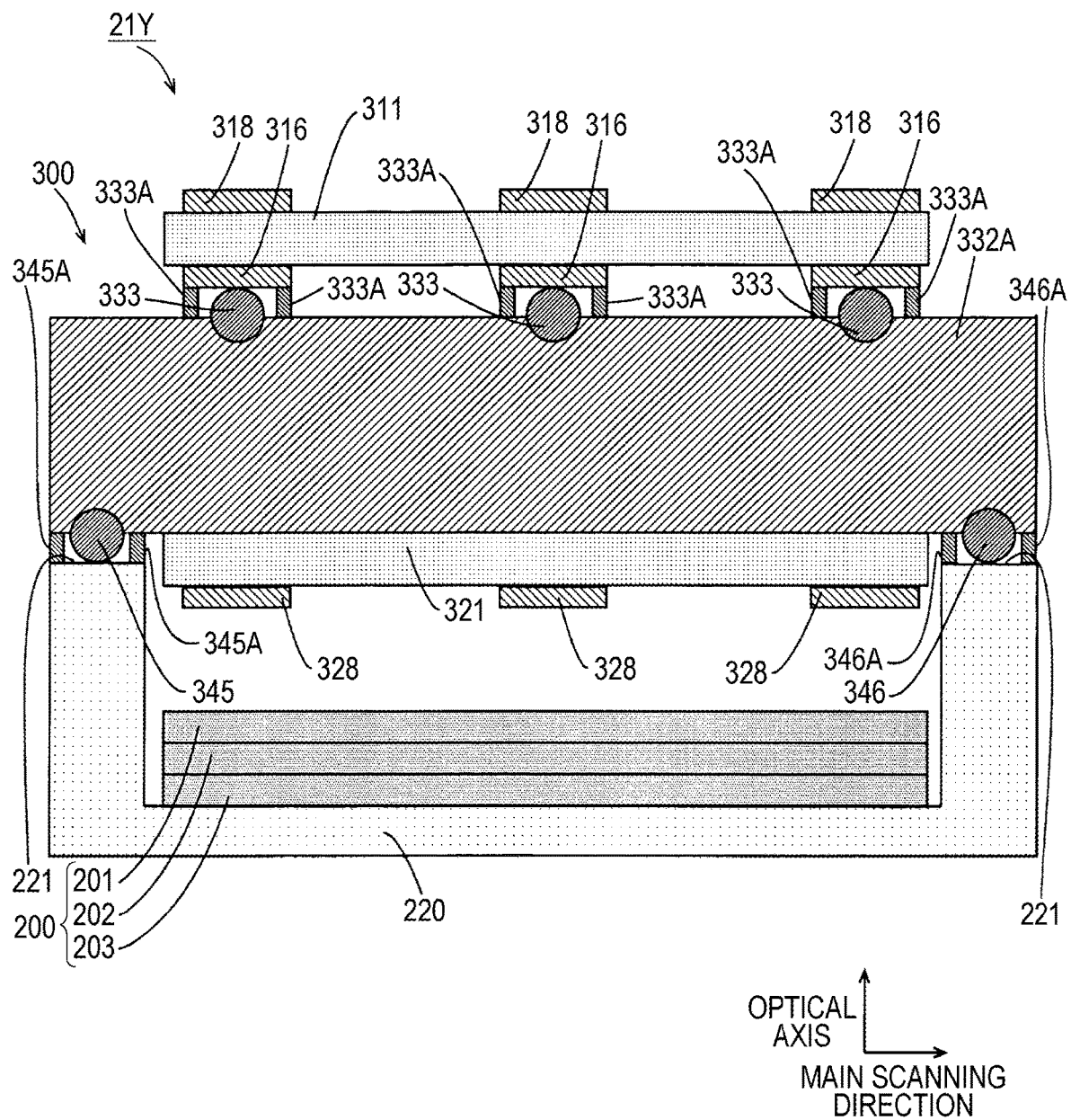
FIG. 10 is a cross-sectional view taken along line A-A in FIG. 9.
Figure 11:
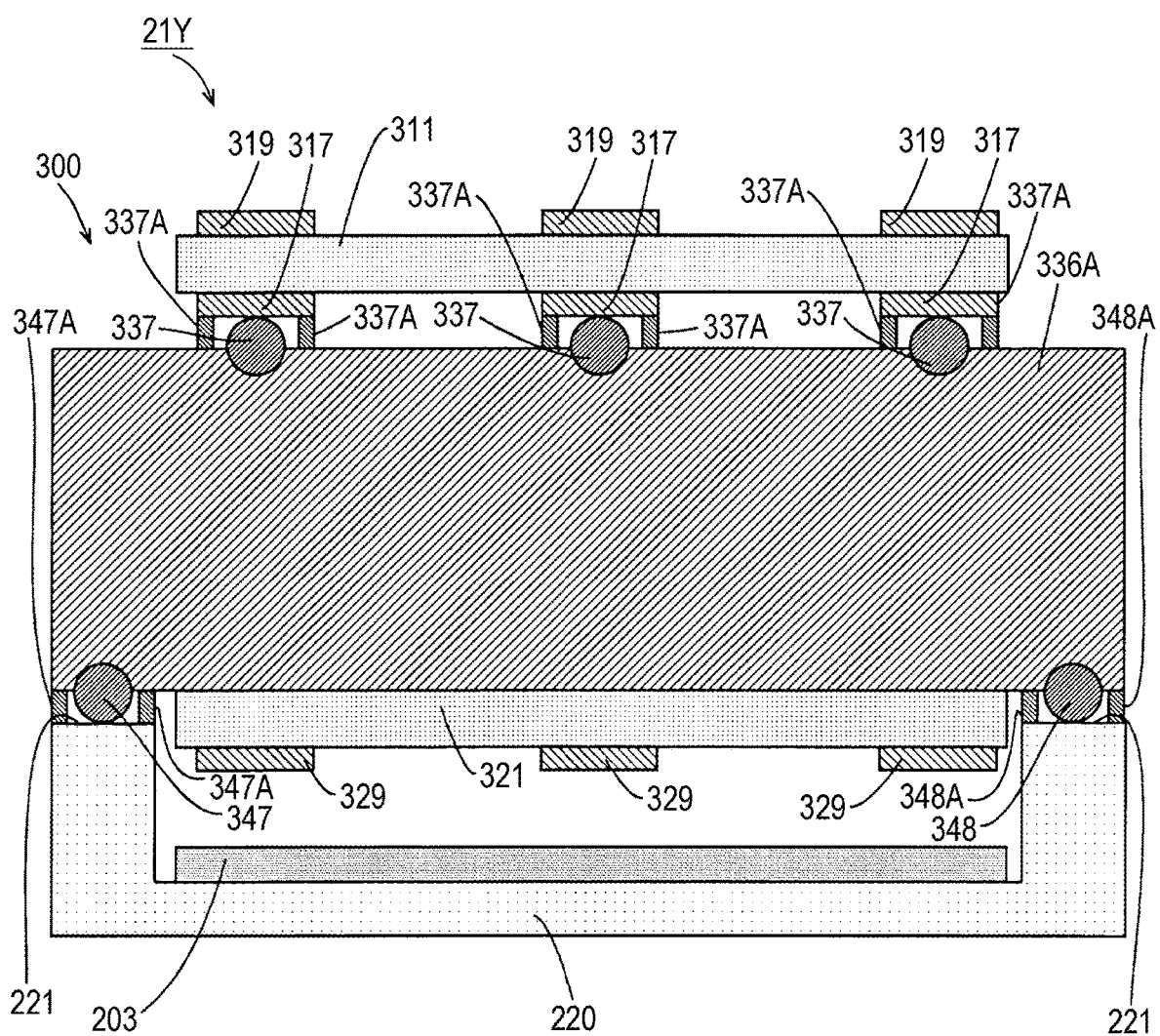
FIG. 11 is a cross-sectional view taken along line B-B in FIG. 9.

FIG. 9 is a diagram of the inside of the exposure device according to a first modification as viewed from the main scanning direction. The main scanning direction is a direction perpendicular to the sheet surface in FIG. 9. FIG. 10 is a cross-sectional view taken along line A-A in FIG. 9. FIG. 11 is a cross-sectional view taken along line B-B in FIG. 9. In FIGS. 10 and 11, the light source holder 220 is added. Referring to FIGS. 9 to 11, differences from the exposure device 21Y shown in FIG. 4 are that the first lens array holder 331 and the second lens array holder 335 are changed to a first lens array holder 331A and a second lens array holder 335A, and that the third seats 326 and the fourth seats 327 are removed. The other members are the same as those of the optical assembly 300 shown in FIG. 4, and thus will not be repeatedly described here.

The first lens array holder 331A includes a body 332A and the first abutting parts 333 disposed on the top surface of the body 332A. The bottom surface of the body 332A is inclined such that the height of the body 332A is shorter on the left side in the subscanning direction than on the right side. The inclination angle is determined by the angle between a normal to the formation surface of the second lens array unit 321 and the optical axes of the second lenses 323, 324, and 325. The first abutting parts 333 abut on the seating surfaces of the first seats 316 of the first lens array unit 311. The body 332A abuts on the formation surface of the second lens array unit 321 at its bottom surface.

Likewise, the second lens array holder 335A includes a body 336A and the second abutting parts 337 disposed on the top surface of the body 336A. The bottom surface of the body 336A is inclined such that the height of the body 336A is shorter on the left side in the subscanning direction than on the right side. The second abutting parts 337 abut on the seating surfaces of the second seats 317 of the first lens array unit 311. The body 336A abuts on the formation surface of the second lens array unit 321 at its bottom surface.

In the optical assembly 300 according to the first modification, since the first lens array holder 331A is inclined at the bottom surface of the body 332A, the position of the first lens array holder 331A relative to the second lens array unit 321 can be easily determined in a state of holding the second lens array unit 321. Likewise, since the second lens array holder 335A is inclined at the bottom surface of the body 336A, the position of the second lens array holder 335A relative to the second lens array unit 321 can be easily determined in a state of holding the second lens array unit 321.

In the optical assembly 300 according to the first modification, the second lens array unit 321 is bonded to the first lens array holder 331A and the second lens array holder 335A positioned by jigs, and then the first lens array unit 311 is positioned. In this state, the jig springs 361 and 363 are brought into contact with the first pressing parts 318 and the second pressing parts 319 of the first lens array unit 311, respectively, applying forces in a direction from above downward, and the jig springs 362 and 364 are brought into contact with the third pressing parts 328 and the fourth pressing parts 329 of the second lens array unit 321, respectively, applying forces in a direction from below upward. In this state, the first lens array unit 311 receives downward forces from the first pressing parts 318 and the second pressing parts 319, and receives upward forces from the first lens array holder 331A and the second lens array holder 335A. Thus, the first lens array unit 311 does not receive forces in the horizontal direction.

Even when the first lens array unit 311 is moved in the horizontal direction, the distance between the first lenses 313 and the second lenses 323 in the first group, the distance between the first lenses 314 and the second lenses 324 in the second group, and the distance between the first lenses 315 and the second lenses 325 in the third group do not change. Thus, the first lens array unit 311 and the second lens array unit 321 are easily adjusted in position in the horizontal direction. Further, the distance between the first lenses 313 and the second lenses 323 in the first group, the distance between the first lenses 314 and the second lenses 324 in the second group, and the distance between the first lenses 315 and the second lenses 325 in the third group are determined by the first lens array holder 331 and the second lens array holder 335. This eliminates the need for the work of adjusting the inter-lens distances of the optical systems including the first lenses 313 and the second lenses 323 in the first group, the optical systems including the first lenses 314 and the second lenses 324 in the second group, and the optical systems including the first lenses 315 and the second lenses 325 in the third group.

The first lens array unit 311 is bonded with the adhesives 333A at the first bonding portions that are regions around the first abutting parts 333 on the top surface of the body 332A of the first lens array holder 331A, and bonded with the adhesives 337A at the second bonding portions that are regions around the second abutting parts 337 on the top surface of the body 336A of the second lens array holder 335A. Consequently, the first bonding portions at the first abutting parts 333 and the second bonding portions at the second abutting parts 337 have a predetermined distance from the seating surfaces of the first seats 316 and the seating surfaces of the second seats 317. Thus, joints formed by the adhesives 333A and 337A cured have a predetermined height.

The adhesives 333A and 337A are of a material having a predetermined elasticity even when cured. Therefore, even when the coefficient of linear expansion of the first lens array unit 311 is different from those of the first lens array holder 331A and the second lens array holder 335A, the joints of the cured adhesives 333A and 337A elastically deform, and thus can prevent separation of the joints of the cured adhesives 333A from the first lens array unit 311 and the first lens array holder 331A at the bonding surfaces, and can prevent separation of the joints of the cured adhesives 337A from the first lens array unit 311 and the second lens array holder 335A at the bonding surfaces.

The first lens array holder 331A includes first holder abutting parts 345 and 346 near both ends of the bottom surface in the main scanning direction. The first holder abutting parts 345 and 346 are each a sphere. The first lens array holder 331A has two holes formed on the bottom surface of the body 332A near both ends in the main scanning direction, in which the first holder abutting parts 345 and 346 are fitted. Likewise, the second lens array holder 335A includes second holder abutting parts 347 and 348 near both ends of the bottom surface in the main scanning direction. The second holder abutting parts 347 and 348 are each a sphere.

On the top surface of the light source holder 220, a pair of first holder seating surfaces 221 are formed which abut on the first holder abutting parts 345 and 346 of the first lens array holder 331, individually. Further, on the top surface of the light source holder 220, a pair of second holder seating surfaces 222 are formed which abut on the second holder abutting parts 347 and 348 of the second lens array holder 335, individually. The pair of first holder seating surfaces 221 and the pair of second holder seating surfaces 222 are perpendicular to the optical axes of the first lenses 313, 314, and 315 and the second lenses 323, 324, and 325. The bottom surface of the body 332 of the first lens array holder 331 and the bottom surface of the body 336 of the second lens array holder 335 are perpendicular to the optical axes of the first lenses 313, 314, and 315 and the second lenses 323, 324, and 325.

A first holder bonding portion that is a region around the first holder abutting part 345 on the bottom surface of the body 332A of the first lens array holder 331A is bonded to the first holder seating surface 221 of the light source holder 220 with an adhesive 345A, and a first holder bonding portion that is a region around the first holder abutting part 346 on the bottom surface of the body 332A of the first lens array holder 331A is bonded to the first holder seating surface 221 of the light source holder 220 with an adhesive 346A. Consequently, the first holder bonding portions around the first holder abutting parts 345 and 346 on the bottom surface of the body 332A of the first lens array holder 331A each have a predetermined distance from the pair of first holder seating surfaces 221 of the light source holder 220. Thus, joints formed by the adhesives 345A and 346A cured have a predetermined height.

A second holder bonding portion that is a region around the second holder abutting part 347 on the bottom surface of the body 336A of the second lens array holder 335A is bonded to the second holder seating surface 222 of the light source holder 220 with an adhesive 347A, and a second holder bonding portion that is a region around the second holder abutting part 348 on the bottom surface of the body 336A of the second lens array holder 335A is bonded to the second holder seating surface 222 of the light source holder 220 with an adhesive 348A. Consequently, the second holder bonding portions around the second holder abutting parts 347 and 348 on the bottom surface of the body 336A of the second lens array holder 335A each have a predetermined distance from the pair of second holder seating surfaces 222 of the light source holder 220. Thus, joints formed by the adhesives 345A and 346A cured have a predetermined height.

The adhesives 345A, 346A, 347A, and 348A are of a material having a predetermined elasticity even when cured. Therefore, even when the first lens array holder 331A and the second lens array holder 335A are different in the coefficient of linear expansion from the light source holder 220, the joints of the cured adhesives 345A, 346A, 347A, and 348A elastically deform, and thus can prevent separation of the joints of the cured adhesives 345A, 346A, 347A, and 348A from the first lens array holder 331A and the light source holder 220 at the bonding surfaces, and from the second lens array holder 335A and the light source holder 220 at the bonding surfaces.

In the exposure device 21Y according to the first modification, the optical assembly 300 is bonded with the adhesives 345A, 346A, 347A, and 348A in a state of being positioned above the light source assembly 200. The pair of first holder seating surfaces 221 where the light source holder 220 abuts on the first holder abutting parts 345 and 346, and the pair of second holder seating surfaces 222 where the light source holder 220 abuts on the second holder abutting parts 347 and 348 are perpendicular to the optical axes of the first lenses 313 to 315 and the second lenses 323 to 325. Therefore, with the optical assembly 300 receiving forces in the direction toward the light source assembly 200 and with the light source assembly 200 being subject to forces in the direction toward the optical assembly 300, the light source assembly 200 and the optical assembly 300 do not receive forces in the horizontal direction. Further, even when the light source assembly 200 and the optical assembly 300 change in relative position in the horizontal direction, the distance between the optical systems including the first lenses 313 and the second lenses 323 in the first group and the first light source board 201, the distance between the optical systems including the first lenses 314 and the second lenses 324 in the second group and the second light source board 202, and the distance between the optical systems including the first lenses 315 and the second lenses 325 in the third group and the third light source board 203 do not change. Therefore, the optical assembly 300 and the light source assembly 200 are easily adjusted in position in the horizontal direction.

Further, the distance between the optical systems including the first lenses 313 and the second lenses 323 in the first group and the first light source board 201, the distance between the optical systems including the first lenses 314 and the second lenses 324 in the second group and the second light source board 202, and the distance between the optical systems including the first lenses 315 and the second lenses 325 in the third group and the third light source board 203 are determined by the light source holder 220. This eliminates the need to adjust the distances between the optical systems and the light sources.

Moreover, in the exposure device according to the first modification, the relative position to the second lens array unit 321 is determined by the first lens array holder 331A and the second lens array holder 335A. Thus, the relative position to the first lens array unit 311 can be adjusted after the second lens array unit 321 is joined to the first lens array holder 331A and the second lens array holder 335A, facilitating alignment.

<Second Modification>

Figure 12:
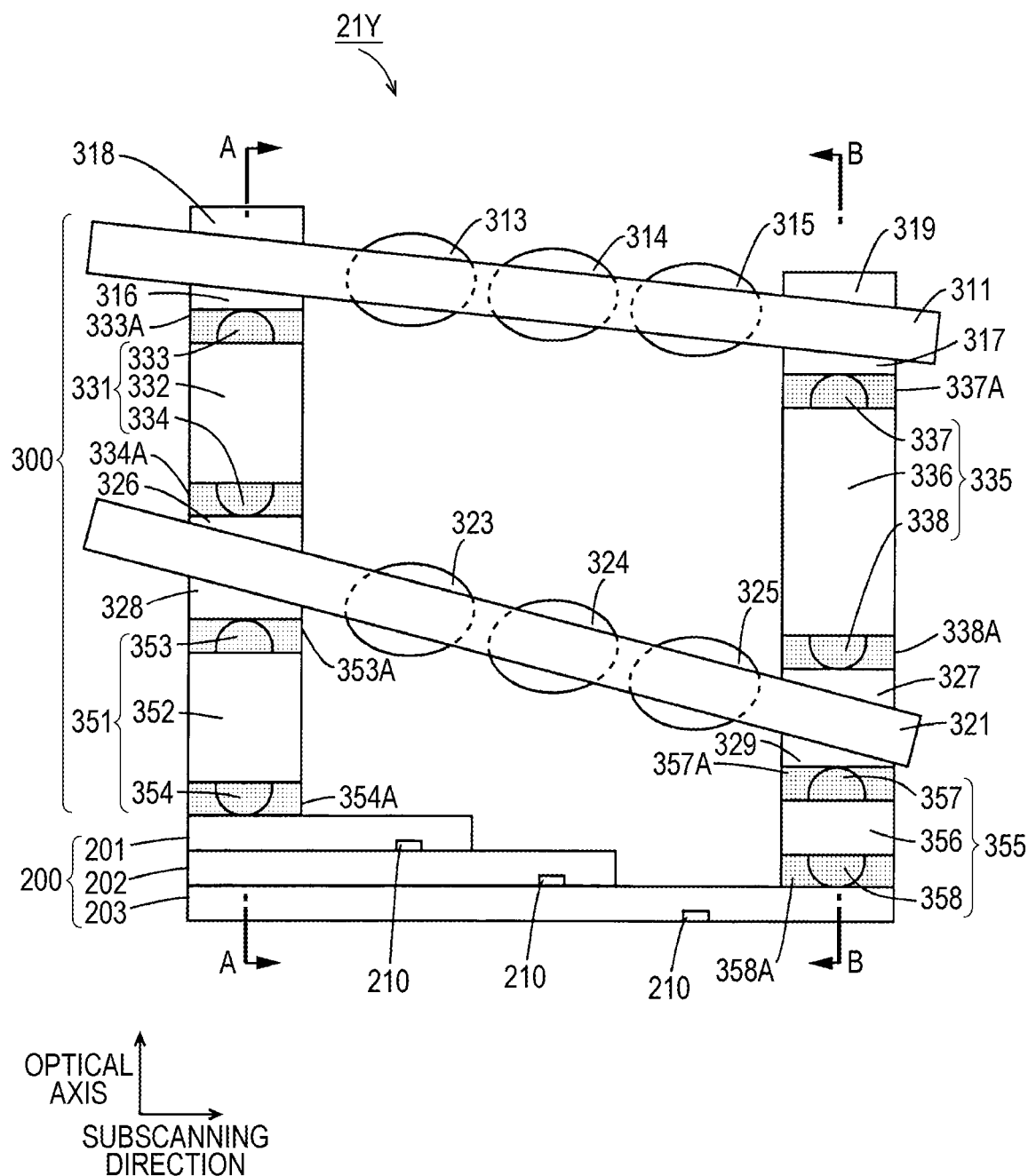
FIG. 12 is a diagram of the exposure device according to a second modification as viewed from the main scanning direction.
Figure 13:
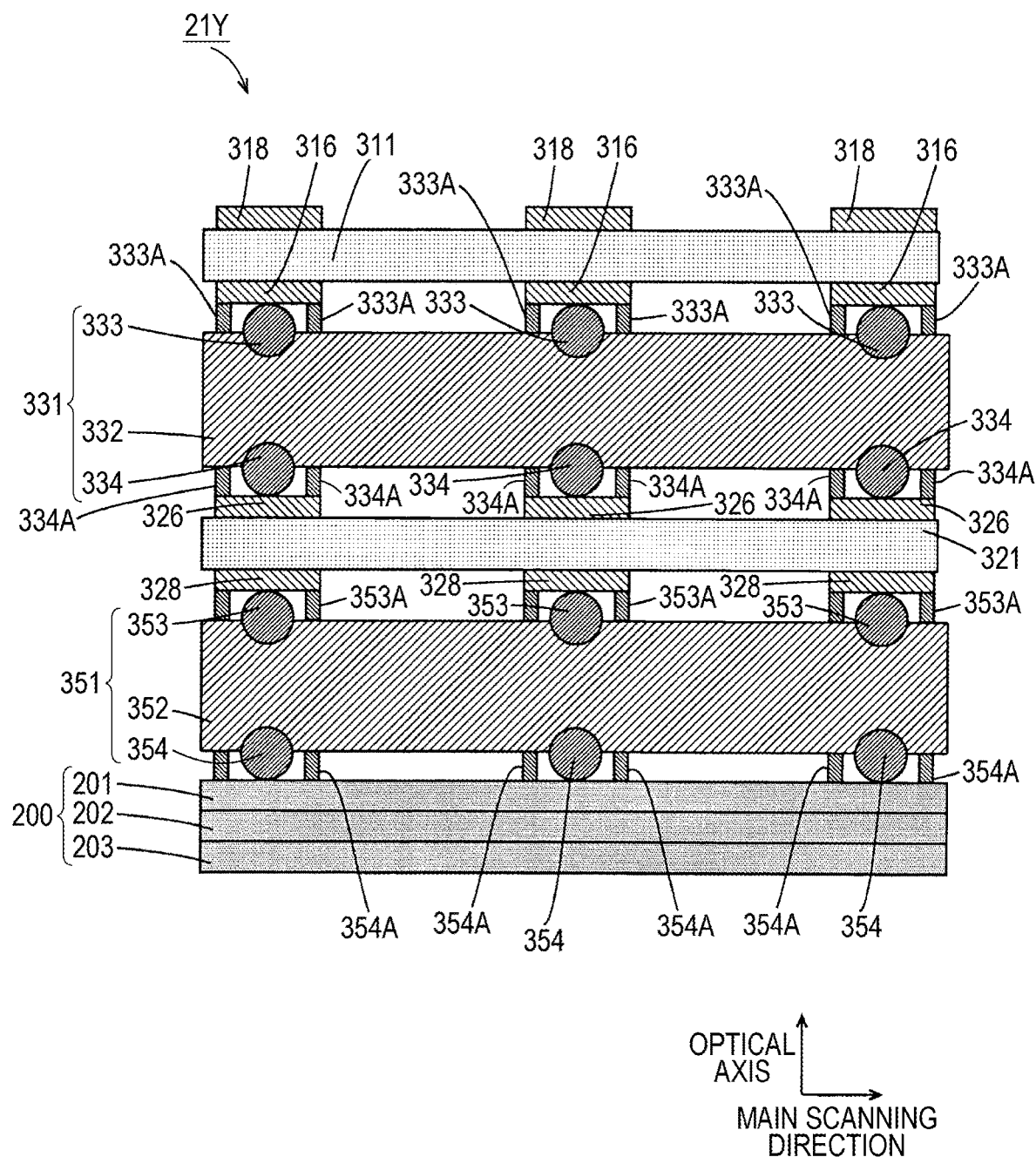
FIG. 13 is a cross-sectional view taken along line A-A in FIG. 12.
Figure 14:
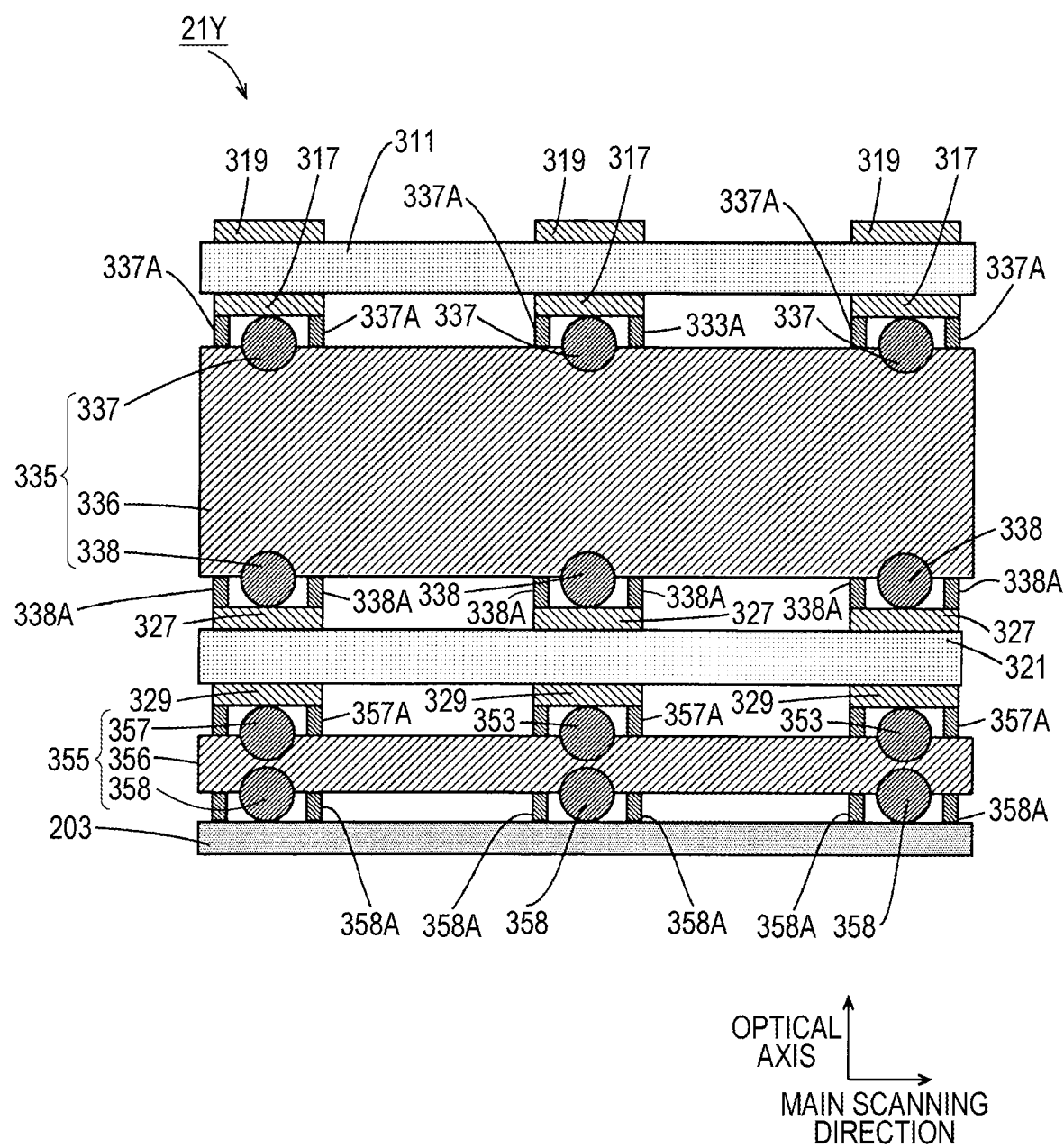
FIG. 14 is a cross-sectional view taken along line B-B in FIG. 12.

FIG. 12 is a diagram of the exposure device according to a second modification as viewed from the main scanning direction. FIG. 13 is a cross-sectional view taken along line A-A in FIG. 12. FIG. 14 is a cross-sectional view taken along line B-B in FIG. 12. The exposure device 21Y in the second modification differs from the exposure device 21Y shown in FIG. 4 in that a first connection holder 351 and a second connection holder 355 are added and that the light source holder 220 is removed. The other members are the same as those of the optical assembly 300 shown in FIG. 4, and thus will not be repeatedly described here. In the exposure device 21Y according to the second modification, the optical assembly 300 is joined to the light source assembly 200 with the first connection holder 351 and the second connection holder 355. This eliminates the need for the light source holder 220, but the light source holder 220 may be used.

The first connection holder 351 includes a rectangular parallelepiped body 352, first connection holder abutting parts 353 disposed on the top surface of the body 352, and third connection holder abutting parts 354 disposed on the bottom surface of the body 352. The first connection holder abutting parts 353 abut on the pressing surfaces of the third pressing parts 328 of the second lens array unit 321, and the third connection holder abutting parts 354 abut on first light source-side seating surfaces of the top surface of the first light source board 201. The distance between the upper ends of the first connection holder abutting parts 353 and the lower ends of the third connection holder abutting parts 354 is determined in advance.

In the present embodiment, the first connection holder abutting parts 353 and the third connection holder abutting parts 354 are each a sphere. The first connection holder 351 has holes formed on the top surface of the body 352, in which the first connection holder abutting parts 353 are fitted, and holes formed on the bottom surface of the body 352 at positions corresponding to the positions of the holes formed on the top surface, in which the third connection holder abutting parts 354 are fitted. Thus, the first connection holder abutting parts 353 are fitted at positions on the top surface of the body 352 opposite to the positions on the bottom surface at which the third connection holder abutting parts 354 are fitted. Consequently, the position of the first connection holder 351 relative to the second lens array unit 321 and the first light source board 201 is determined such that the respective centers of the first connection holder abutting parts 353 and the third connection holder abutting parts 354 are at positions passing through straight lines parallel to the respective optical axes of the first lenses 313, 314, and 315 and the second lenses 323, 324, and 325.

Like the first connection holder 351, the second connection holder 355 includes a rectangular parallelepiped body 356, second connection holder abutting parts 357 disposed on the top surface of the body 356, and fourth connection holder abutting parts 358 disposed on the bottom surface of the body 356. The second connection holder abutting parts 357 abut on the pressing surfaces of the fourth pressing parts 329 of the second lens array unit 321, and the fourth connection holder abutting parts 358 abut on second light source-side seating surfaces of the top surface of the third light source board 203. The distance between the upper ends of the second connection holder abutting parts 357 and the lower ends of the fourth connection holder abutting parts 358 is determined in advance.

Figure 15:
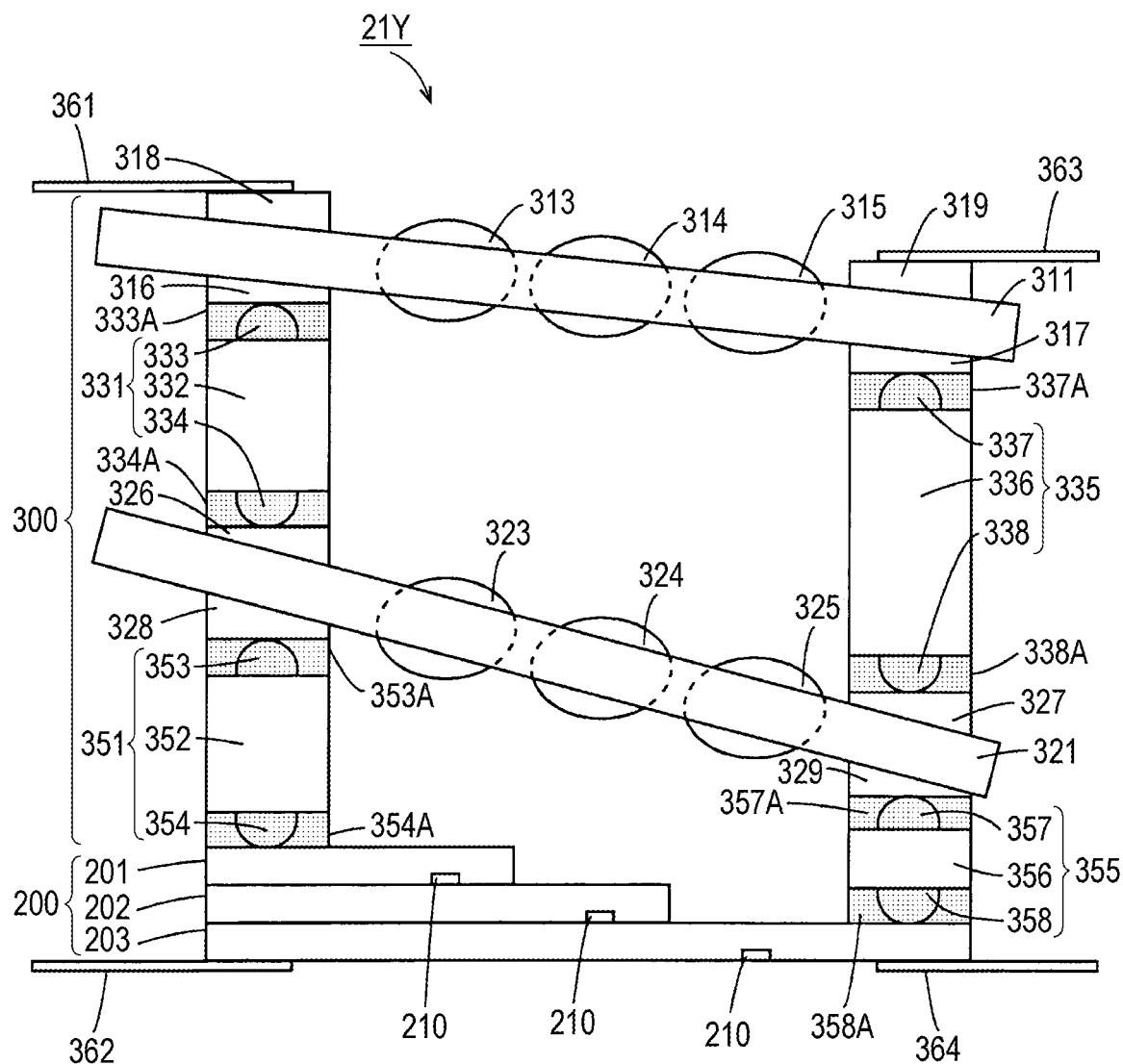
FIG. 15 is a diagram of the exposure device according to the second modification in the course of manufacture as viewed from the main scanning direction.

FIG. 15 is a diagram of the exposure device according to the second modification in the course of manufacture as viewed from the main scanning direction. Referring to FIG. 15, the exposure device 21Y is fixed by the pair of jig springs 361 and 362 and the pair of jig springs 363 and 364 sandwiching it from above and below.

Specifically, in the exposure device 21Y, the light source assembly 200 and the optical assembly 300 are positioned on the first connection holder 351 and the second connection holder 355 positioned by jigs. In this state, the jig springs 361 and 363 are brought into contact with the first pressing parts 318 and the second pressing parts 319 of the first lens array unit 311, respectively, applying forces in a direction from above downward. The jig springs 362 and 364 are brought into contact with both ends of the bottom surface of the third light source board 203 of the optical assembly 300, individually, applying forces in a direction from below upward. The light source assembly 200 and the optical assembly 300 may be assembled at the same time.

In this state, the optical assembly 300 receives downward forces at the first pressing parts 318 and the second pressing parts 319 of the first lens array unit 311, and receives upward forces from the first connection holder 351 and the second connection holder 355 at the third pressing parts 328 and the fourth pressing parts 329 of the second lens array unit 321. The light source assembly 200 receives upward forces at both ends of the bottom surface of the third light source board 203, and receives upward forces at the top surface of the first light source board 201 and the top surface of the third light source board 203. Consequently, the optical assembly 300 and the light source assembly 200 do not receive forces in the horizontal direction.

Even when the light source assembly 200 or the optical assembly 300 is moved in the horizontal direction, the distance between the light source assembly 200 and the optical assembly 300 does not change, so that the light source assembly 200 or the optical assembly 300 is easily adjusted in position in the horizontal direction. The distance between the light source assembly 200 and the optical assembly 300 is determined by the first connection holder 351 and the second connection holder 355. This eliminates the need for the work of adjusting the distance between the light source assembly 200 and the optical assembly 300.

The optical assembly 300 is bonded to the first connection holder 351 and the second connection holder 355 with adhesives 353A and 357A at first connection holder bonding portions that are regions around the first connection holder abutting parts 353 of the first connection holder 351, and second connection holder bonding portions that are regions around the second connection holder abutting parts 357 of the second connection holder 355. Thus, the adhesives 353A and 357A are not applied to the first connection holder abutting parts 353 and the second connection holder abutting parts 357. A predetermined distance is provided between the first connection holder bonding portions around the first connection holder abutting parts 353 and the third pressing parts 328 of the second lens array unit 321, and a predetermined distance is provided between the second connection holder bonding portions around the second connection holder abutting parts 357 and the fourth pressing parts 329 of the second lens array unit 321. Thus, joints formed by the adhesives 353A and 357A cured have a predetermined height. The adhesives 353A and 357A are of a material having a predetermined elasticity even when cured. Therefore, even when the coefficients of linear expansion of the second lens array unit 321 of the optical assembly 300 and the first connection holder 351 and the second connection holder 355 are different, the joints of the cured adhesives 353A and 357A elastically deform, and thus can prevent separation of the joints of the cured adhesives 353A and 357A from the second lens array unit 321, the first connection holder 351, and the second connection holder 355 at the bonding surfaces.

Likewise, the light source assembly 200 is bonded to the first connection holder 351 and the second connection holder 355 with adhesives 354A and 358A at third connection holder bonding portions that are regions around the third connection holder abutting parts 354, and fourth connection holder bonding portions that are regions around the fourth connection holder abutting parts 358. Thus, the adhesives 354A and 358A are not applied to the third connection holder abutting parts 354 and the fourth connection holder abutting parts 358. A predetermined distance is provided between the third connection holder bonding portions around the third connection holder abutting parts 354 of the first connection holder 351 and the first light source board 201, and a predetermined distance is provided between the fourth connection holder bonding portions around the fourth connection holder abutting parts 358 of the second connection holder 355 and the third light source board 203. Thus, joints formed by the adhesives 354A and 358A cured have a predetermined height.

The adhesives 354A and 358A are of a material having a predetermined elasticity even when cured. Therefore, even when the coefficient of linear expansion of the first connection holder 351 and the second connection holder 355 is different from that of the first light source board 201, the second light source board 202, and the third light source board 203, the joints of the cured adhesives 354A and 358A elastically deform, and thus can prevent separation of the joints of the cured adhesives 354A and 358A from the first connection holder 351, the second connection holder 355, the first light source board 201, and the third light source board 203 at the bonding surfaces.

<Third Modification>

Figure 16:
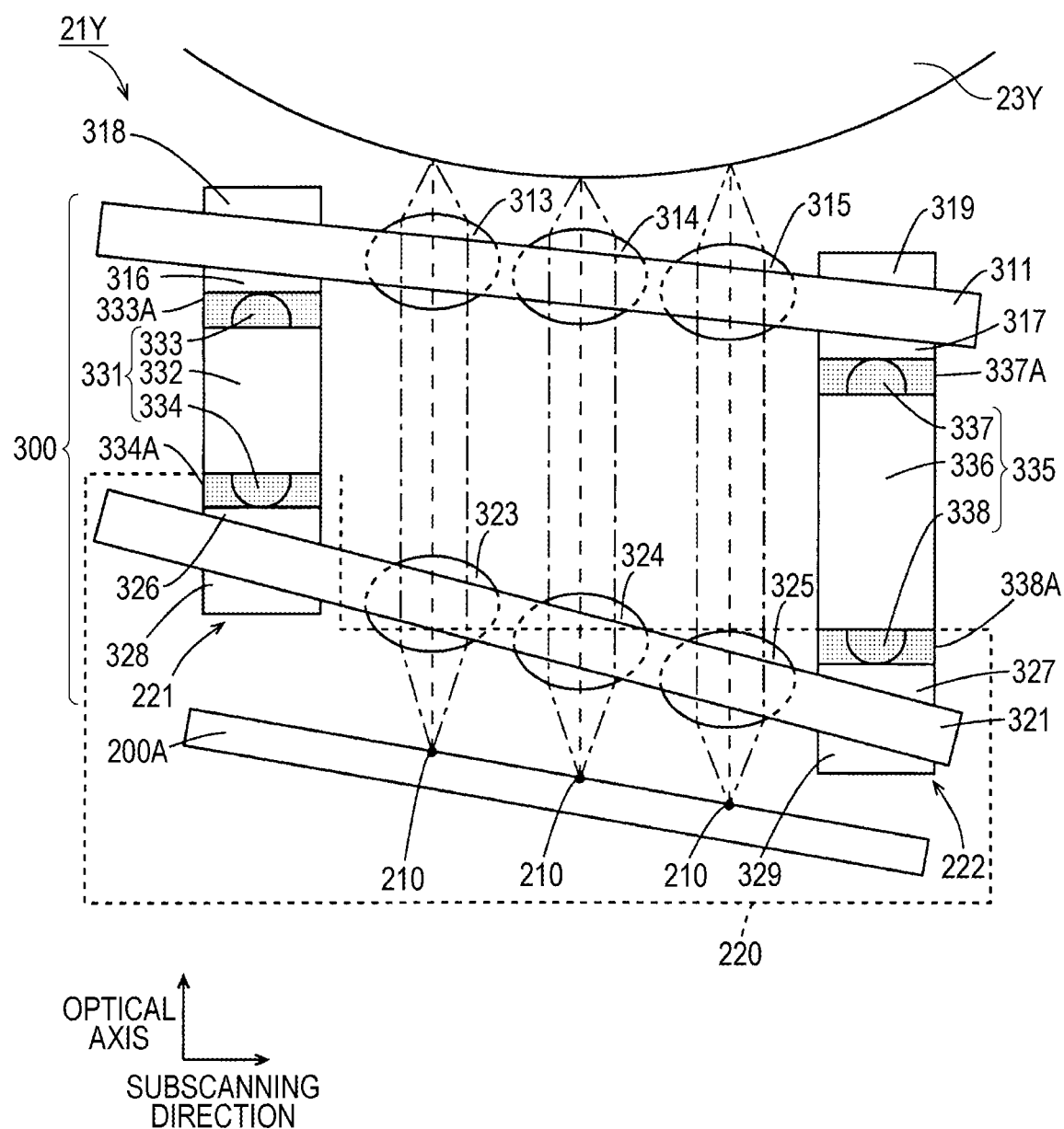
FIG. 16 is a diagram of part of the exposure device according to a third modification as viewed from the main scanning direction.

The exposure device 21Y according to a third modification includes a modified light source assembly. FIG. 16 is a diagram of part of the exposure device according to the third modification as viewed from the main scanning direction. Referring to FIG. 16, the difference from the exposure device 21Y shown in FIG. 4 is that the light source assembly 200 is changed to a light source assembly 200A. The other members are the same as those of the exposure device 21Y shown in FIG. 4, and thus will not be repeatedly described here.

The light source assembly 200A includes a light source board 205. The light source board 205 includes a plurality of light sources 210 formed at different positions in the direction parallel to the optical axes and a direction perpendicular to the optical axes. The light source board 205 is held in a position where the position of a light source formation surface in which the plurality of light sources 210 is formed relative to the optical assembly 300 is not perpendicular to the optical axes of the optical assembly 300.

The light source assembly 200A according to the third modification may be applied to the first modification or the second modification.

<Fourth Modification>

The first holder abutting parts 345 and 346 and the second holder abutting parts 347 and 348 included in the exposure device 21Y in the first modification may be applied to the exposure device 21Y in the above-described embodiment, to combine the light source assembly 200 and the optical assembly 300. Further, without using the first holder abutting parts 345 and 346 and the second holder abutting parts 347 and 348 in the exposure device 21Y according to the first modification, as in the exposure device 21Y in the above-described embodiment, the light source assembly 200 and the optical assembly 300 may be combined.

According to an embodiment of the present invention, since the first lens array unit includes the plurality of optical elements formed in the formation surface not perpendicular to the optical axes, a plurality of optical systems including the plurality of optical elements formed in the first lens array unit and the plurality of optical elements formed in the second lens array unit can constitute a plurality of optical systems in which the distance between two optical elements varies. Consequently, the plurality of optical systems has different focal lengths, and thus can concentrate light emitted from the plurality of light-emitting devices disposed at different positions in the direction parallel to the optical axes at appropriate positions. Further, the first lens array holder abuts on the first seating surface of the first lens array unit provided on the surface facing the second lens array unit, the second lens array holder abuts on the second seating surface of the first lens array unit provided on the surface facing the second lens array unit, and the first seating surface and the second seating surface are perpendicular to the optical axes. Therefore, even when the first lens array unit changes in position relative to the second lens array unit in a plane perpendicular to the optical axes, the distance between the two optical elements of each of the plurality of optical systems in the direction parallel to the optical axes does not change. This facilitates alignment between the first lens array unit and the second lens array unit in the direction perpendicular to the optical axes. As a result, the exposure device easy to manufacture can be provided.

According to an embodiment of the present invention, the first lens array holder abuts on the first seating surface at the first abutting part, and is bonded to the first seating surface at the first bonding portion that does not abut on the first seating surface, and the second lens array holder abuts on the second seating surface at the second abutting part, and is bonded to the second seating surface at the second bonding portion that does not abut on the second seating surface. Consequently, the first bonding portion is apart from the first seating surface and the second bonding portion is apart from the second seating surface by a predetermined distance, so that the amount of elastic deformation of adhesives can be increased. As a result, even when the coefficient of linear expansion of the first lens array holder and the second lens array holder is different from the coefficient of linear expansion of the first lens array unit, the bonding between the first lens array holder and the second lens array holder and the first lens array unit can be prevented from being broken.

According to an embodiment of the present invention, since the first pressing surface and the second pressing surface are perpendicular to the optical axes, forces parallel to the optical axes can be applied to the first lens array unit.

According to an embodiment of the present invention, the first seating surface, the second seating surface, and the plurality of optical elements can be formed in one process step, so that the angle of the first seating surface and the second seating surface with respect to the optical axes can be accurately formed.

According to an embodiment of the present invention, the first lens array holder abuts on the third seating surface of the second lens array unit provided on the surface facing the first lens array unit, the second lens array holder abuts on the fourth seating surface of the second lens array unit provided on the surface facing the first lens array unit, and the third seating surface and the fourth seating surface are perpendicular to the optical axes. Thus, even when the second lens array unit changes in position relative to the first lens array unit in the direction perpendicular to the optical axes, the distance between the two optical elements of each of the plurality of optical systems in the direction parallel to the optical axes does not change. This facilitates alignment between the first lens array unit and the second lens array unit in the direction perpendicular to the optical axes.

According to an embodiment of the present invention, the first lens array holder abuts on the third seating surface at the third abutting part, and is bonded to the third seating surface at the third bonding portion that does not abut on the third seating surface, and the second lens array holder abuts on the fourth seating surface at the fourth abutting part, and is bonded to the fourth seating surface at the fourth bonding portion that does not abut on the fourth seating surface. Consequently, the third bonding portion is apart from the third seating surface and the fourth bonding portion is apart from the fourth seating surface by a predetermined distance, so that the amount of elastic deformation of adhesives can be increased. As a result, even when the coefficient of linear expansion of the first lens array holder and the second lens array holder is different from the coefficient of linear expansion of the second lens array unit, the bonding between the first lens array holder and the second lens array holder and the second lens array unit can be prevented from being broken.

According to an embodiment of the present invention, the third seating surface, the fourth seating surface, and the plurality of optical elements can be formed in one process step, so that the angle of the third seating surface and the fourth seating surface with respect to the optical axes can be accurately formed.

According to an embodiment of the present invention, since the third pressing surface and the fourth pressing surface are perpendicular to the optical axes, forces parallel to the optical axes can be applied to the second lens array unit.

According to an embodiment of the present invention, the first lens array holder abuts on the first holder seating surface provided at the light source assembly, the second lens array holder abuts on the second holder seating surface provided at the light source assembly, and the first holder seating surface and the second holder seating surface are perpendicular to the optical axes. Thus, even when the second lens array unit changes in position relative to the light source assembly in a plane perpendicular to the optical axes, the distance in the direction parallel to the optical axes between the plurality of optical elements formed in the second lens array unit and the plurality of light source devices included in the light source assembly does not change. This facilitates alignment between the second lens array unit and the light source assembly in the direction perpendicular to the optical axes.

According to an embodiment of the present invention, the first lens array holder abuts on the first holder seating surface at the first holder abutting part, and is bonded to the first holder seating surface at the first holder bonding portion that does not abut on the first holder seating surface, and the second lens array holder abuts on the second holder seating surface at the second holder abutting part, and is bonded to the second holder seating surface at the second holder bonding portion that does not abut on the second holder seating surface. Consequently, the first holder bonding portion is apart from the first holder seating surface and the second holder bonding portion is apart from the second holder seating surface by a predetermined distance, so that the amount of elastic deformation of adhesives can be increased. As a result, even when the coefficient of linear expansion of the first lens array holder and the second lens array holder is different from the coefficient of linear expansion of the light source assembly, the bonding between the first lens array holder and the second lens array holder and the light source assembly can be prevented from being broken.

According to an embodiment of the present invention, the first connection holder abuts on the third pressing surface, the second connection holder abuts on the fourth pressing surface, and the third pressing surface and the fourth pressing surface are perpendicular to the optical axes. Thus, even when the second lens array unit changes in position relative to the light source assembly in a plane perpendicular to the optical axes, the distance between the second lens array unit and the light source assembly in the direction parallel to the optical axes does not change. This facilitates alignment between the second lens array unit and the light source assembly in the direction perpendicular to the optical axes.

According to an embodiment of the present invention, the first connection holder abuts on the third pressing surface at the first connection holder abutting part, and is bonded to the third pressing surface at the first connection holder bonding portion that does not abut on the third pressing surface, and the second connection holder abuts on the fourth pressing surface at the second connection holder abutting part, and is bonded to the fourth pressing surface at the second connection holder bonding portion that does not abut on the fourth pressing surface. Consequently, the first connection holder bonding portion is apart from the third pressing surface and the second connection holder bonding portion is apart from the fourth pressing surface by a predetermined distance, so that the amount of elastic deformation of adhesives can be increased. As a result, even when the coefficient of linear expansion of the first connection holder and the second connection holder is different from the coefficient of linear expansion of the second lens array unit, the bonding between the first connection holder and the second connection holder and the second lens array unit can be prevented from being broken.

According to an embodiment of the present invention, the first connection holder abuts on the first light source-side seating surface at the third connection holder abutting part, and is bonded to the first light source-side seating surface at the third connection holder bonding portion that does not abut on the first light source-side seating surface, and the second connection holder abuts on the second light source-side seating surface at the fourth connection holder abutting part, and is bonded to the second light source-side seating surface at the fourth connection holder bonding portion that does not abut on the second light source-side seating surface. Consequently, the third connection holder bonding portion is apart from the first light source-side seating surface and the fourth connection holder bonding portion is apart from the second light source-side seating surface by a predetermined distance, so that the amount of elastic deformation of adhesives can be increased. As a result, even when the coefficient of linear expansion of the first connection holder and the second connection holder is different from the coefficient of linear expansion of the light source assembly, the bonding between the first connection holder and the second connection holder and the light source assembly can be prevented from being broken.

According to an embodiment of the present invention, the plurality of light source devices can be disposed at different positions in the direction parallel to the optical axes.

According to an embodiment of the present invention, the image forming apparatus easy to manufacture can be provided.

Although embodiments of the present invention have been described and illustrated in detail, the disclosed embodiments are made for purposes of illustration and example only and not limitation in every respect. The scope of the present invention should be interpreted by terms of the appended claims and is intended to include all modifications within meaning and scope equivalent to the scope of the claims.

What is claimed is:

1. An exposure device comprising:
   a first lens array unit and a second lens array unit each including a plurality of optical elements formed in a formation surface with respective optical axes parallel to each other, the formation surface of the first lens army unit being not perpendicular to the optical axes;
   a first lens array holder and a second lens array holder that hold the first lens array unit and the second lens array unit with the respective optical axes of the plurality of optical elements parallel to each other; and
   a light source assembly in which optical element groups each including a plurality of light-emitting devices aligned in a direction perpendicular to the optical axes are disposed at different positions in a direction parallel to the optical axes,
   wherein the first lens array unit is provided with a first seating surface on which the first lens array holder abuts and a second seating surface on which the second lens array holder abuts, on a surface facing the second lens array unit, and
   the first seating surface and the second seating surface are perpendicular to the optical axes.

2. The exposure device according to claim 1, wherein
   the first lens array holder includes a first abutting part that abuts on the first seating surface and a first bonding portion that is bonded to the first seating surface without abutting thereon, and
   the second lens array holder includes a second abutting part that abuts on the second seating surface and a second bonding portion that is bonded to the second seating surface without abutting thereon.

3. The exposure device according to claim 1, wherein the first lens array unit is provided with a first pressing surface perpendicular to the optical axes on a surface opposite to the surface on which the first seating surface is provided, and a second pressing surface perpendicular to the optical axes on a surface opposite to the surface on which the second seating surface is provided.

4. The exposure device according to claim 1, wherein the first seating surface and the second seating surface are formed of the same material as the plurality of optical elements.

5. The exposure device according to claim 1, wherein
the first lens array holder abuts on the first seating surface and the second lens array unit, and
the second lens array holder abuts on the second seating surface and the second lens array unit.

6. The exposure device according to claim 1, wherein
the formation surface of the second lens array unit is not perpendicular to the optical axes, and the second lens array unit is provided with a third seating surface on which the first lens array holder abuts and a fourth seating surface on which the second lens array holder abuts, on a surface facing the first lens array unit, and
the third seating surface and the fourth seating surface are perpendicular to the optical axes.

7. The exposure device according to claim 6, wherein
the first lens array holder includes a third abutting part that abuts on the third seating surface and a third bonding portion that is bonded to the third seating surface without abutting thereon, and
the second lens array holder includes a fourth abutting part that abuts on the fourth seating surface and a fourth bonding portion that is bonded to the fourth seating surface without abutting thereon.

8. The exposure device according to claim 6, wherein the third seating surface and the fourth seating surface are formed of the same material as the plurality of optical elements.

9. The exposure device according to claim 6, wherein the second lens array unit is provided with a third pressing surface perpendicular to the optical axes on a surface opposite to the surface on which the third seating surface is provided, and a fourth pressing surface perpendicular to the optical axes on a surface opposite to the surface on which the fourth seating surface is provided.

10. The exposure device according to claim 9, further comprising:
a first connection holder and a second connection holder that hold the second lens array unit and the light source assembly, the first connection holder abutting on the third pressing surface and the light source assembly, the second connection holder abutting on the fourth pressing surface and the light source assembly.

11. The exposure device according to claim 10, wherein the first connection holder includes a first connection holder abutting part that abuts on the third pressing surface and a first connection holder bonding portion that is bonded to the third pressing surface without abutting thereon, and
the second connection holder includes a second connection holder abutting part that abuts on the fourth pressing surface and a second connection holder bonding portion that is bonded to the fourth pressing surface without abutting thereon.

12. The exposure device according to claim 10, wherein
the light source assembly is provided with a first light source-side seating surface and a second light source-side seating surface perpendicular to the optical axes,
the first connection holder further includes a third connection holder abutting part that abuts on the first light source-side seating surface and a third connection holder bonding portion that is bonded to the first light source-side seating surface without abutting thereon, and
the second connection holder further includes a fourth connection holder abutting part that abuts on the second light source-side seating surface and a fourth connection holder bonding portion that is bonded to the second light source-side seating surface without abutting thereon.

13. The exposure device according to claim 1, wherein
the light source assembly is provided with a first holder seating surface and a second holder seating surface perpendicular to the optical axes,
the first lens array holder further abuts on the first holder seating surface, and
the second lens array holder further abuts on the second holder seating surface.

14. The exposure device according to claim 13, wherein
the first lens array holder further includes a first holder abutting part that abuts on the first holder seating surface and a first holder bonding portion that is bonded to the first holder seating surface without abutting thereon, and
the second lens array holder further includes a second holder abutting part that abuts on the second holder seating surface and a second holder bonding portion that is bonded to the second holder seating surface without abutting thereon.

15. The exposure device according to claim 1, wherein the light source assembly includes a light source board with the plurality of light-emitting devices formed in a light source surface, the light source board being held with the light source surface not perpendicular to the optical axes.

16. The exposure device according to claim 1, wherein the first lens array unit and the second lens array unit are bonded to the first lens array holder and the second lens array holder, constituting an optical assembly.

17. The exposure device according to claim 1, wherein the first lens array unit and the second lens array unit are positioned by the first lens array holder and the second lens array holder such that light that has passed through one of the plurality of optical elements formed in the second lens array unit passes through one of the plurality of optical elements formed in the first lens array unit.

18. An image forming apparatus comprising the exposure device according to claim 1.

* * * * *